(12) United States Patent
Amizur et al.

(10) Patent No.: US 10,686,628 B2
(45) Date of Patent: Jun. 16, 2020

(54) ACCESS POINT (AP), STATION (STA) AND METHODS OF CHANNEL SOUNDING IN ACCORDANCE WITH CONTENTION BASED ACCESS

(71) Applicant: Intel IP Corporation, Santa Clara, CA (US)

(72) Inventors: Yuval Amizur, Kfar-Saba (IL); Chittabrata Ghosh, Fremont, CA (US); Jonathan Segev, Tel Mond (IL); Feng Jiang, Santa Clara, CA (US); Qinghua Li, San Ramon, CA (US); Nir Dvorecki, Herzeliya (IL); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 15 days.

(21) Appl. No.: 15/719,392

(22) Filed: Sep. 28, 2017

(65) Prior Publication Data

US 2018/0139077 A1    May 17, 2018

Related U.S. Application Data

(60) Provisional application No. 62/421,687, filed on Nov. 14, 2016.

(51) Int. Cl.
*H04L 25/02* (2006.01)
*H04W 24/10* (2009.01)
(Continued)

(52) U.S. Cl.
CPC ....... *H04L 25/0224* (2013.01); *H04B 1/0064* (2013.01); *H04L 25/0204* (2013.01); *H04L 27/0006* (2013.01); *H04W 24/10* (2013.01); *H04L 27/2602* (2013.01); *H04W 84/12* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 8,538,445 B2 * | 9/2013 | Suo | H04W 72/1289 370/329 |
| 2006/0035643 A1 * | 2/2006 | Vook | H04L 5/0094 455/450 |

(Continued)

*Primary Examiner* — Khaled M Kassim
(74) *Attorney, Agent, or Firm* — Schwegman Lundberg & Woessner, P.A.

(57) ABSTRACT

Embodiments of an access point (AP), station (STA) and method of sounding are generally described herein. The AP may transmit, during a transmission opportunity (TXOP), a trigger frame (TF) to indicate that an STA is to transmit an uplink sounding packet during an uplink sounding period of the TXOP. The AP may attempt to detect the uplink sounding packet during the uplink sounding period. If the uplink sounding packet is not detected during the uplink sounding period, the AP may transmit a recovery packet to cause other STAs to determine a busy condition during the uplink sounding period. If the uplink sounding packet is detected during the uplink sounding period, the AP may determine a channel estimate for the STA based at least partly on the uplink sounding packet.

11 Claims, 13 Drawing Sheets

(51) Int. Cl.
  *H04B 1/00*     (2006.01)
  *H04L 27/00*    (2006.01)
  *H04W 88/02*        (2009.01)
  *H04W 84/12*        (2009.01)
  *H04W 88/08*        (2009.01)
  *H04L 27/26*        (2006.01)

(56) References Cited

U.S. PATENT DOCUMENTS

| | | | | |
|---|---|---|---|---|
| 2009/0239565 | A1* | 9/2009 | Han | H04B 7/0404 455/512 |
| 2009/0316676 | A1* | 12/2009 | Kolding | H04L 1/0026 370/345 |
| 2011/0243262 | A1* | 10/2011 | Ratasuk | H04L 5/003 375/260 |
| 2012/0188925 | A1* | 7/2012 | Lee | H04B 7/0452 370/311 |
| 2012/0314592 | A1* | 12/2012 | Behravan | H04B 7/2656 370/252 |
| 2014/0112246 | A1* | 4/2014 | Park | H04W 74/002 370/328 |
| 2014/0301208 | A1* | 10/2014 | Merlin | H04W 28/0273 370/236 |
| 2016/0143026 | A1* | 5/2016 | Seok | H04W 72/0413 370/329 |
| 2016/0295581 | A1* | 10/2016 | Ghosh | H04W 72/0446 |
| 2016/0302232 | A1* | 10/2016 | Ghosh | H04W 74/0833 |
| 2016/0338040 | A1* | 11/2016 | Lee | H04W 72/0413 |
| 2017/0111159 | A1* | 4/2017 | Lee | H04L 5/001 |
| 2017/0134187 | A1* | 5/2017 | Chen | H04B 7/0413 |
| 2017/0208625 | A1* | 7/2017 | Choi | H04L 27/26 |
| 2017/0251449 | A1* | 8/2017 | Malik | H04W 64/003 |
| 2017/0257859 | A1* | 9/2017 | Li | H04W 52/146 |
| 2017/0272138 | A1* | 9/2017 | Chun | H04L 29/08 |
| 2017/0311325 | A1* | 10/2017 | Cariou | H04B 7/0452 |
| 2018/0053089 | A1* | 2/2018 | Gokmen | G06N 3/0635 |
| 2018/0054794 | A1* | 2/2018 | Cariou | H04W 64/00 |
| 2018/0070330 | A1* | 3/2018 | Chu | G01S 5/0205 |
| 2018/0167177 | A1* | 6/2018 | Huang | H04L 5/0091 |
| 2018/0213424 | A1* | 7/2018 | Du | H04W 24/00 |
| 2018/0343580 | A1* | 11/2018 | Xiang | H04W 24/08 |
| 2018/0359807 | A1* | 12/2018 | Kim | H04L 5/00 |

* cited by examiner

ACCESS POINT (AP), STATION (STA) AND METHODS OF CHANNEL SOUNDING IN ACCORDANCE WITH CONTENTION BASED ACCESS

PRIORITY CLAIM

This application claims priority under 35 USC 119(e) to U.S. Provisional Patent Application Ser. No. 62/421,687, filed Nov. 14, 2016 [reference number P111974Z (9884.090PRV)], which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, including but not limited to IEEE 802.11ax. Some embodiments relate to channel sounding. Some embodiments relate to contention-based access, including exchanging of sounding frames during contention periods.

BACKGROUND

A base station of a network may communicate with multiple mobile devices to exchange voice, data, control messages and other types of signals. In some cases, a channel may be accessible by the network and possibly by devices of other networks. For instance, contention based access may be used, in which devices monitor the channel for idle periods before beginning a transmission in the channel. Scenarios may arise in which a device mistakenly determines that the channel is available. The device may cause interference if it transmits when the channel is not really available. Accordingly, there is a general need for devices and methods to address such challenges in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
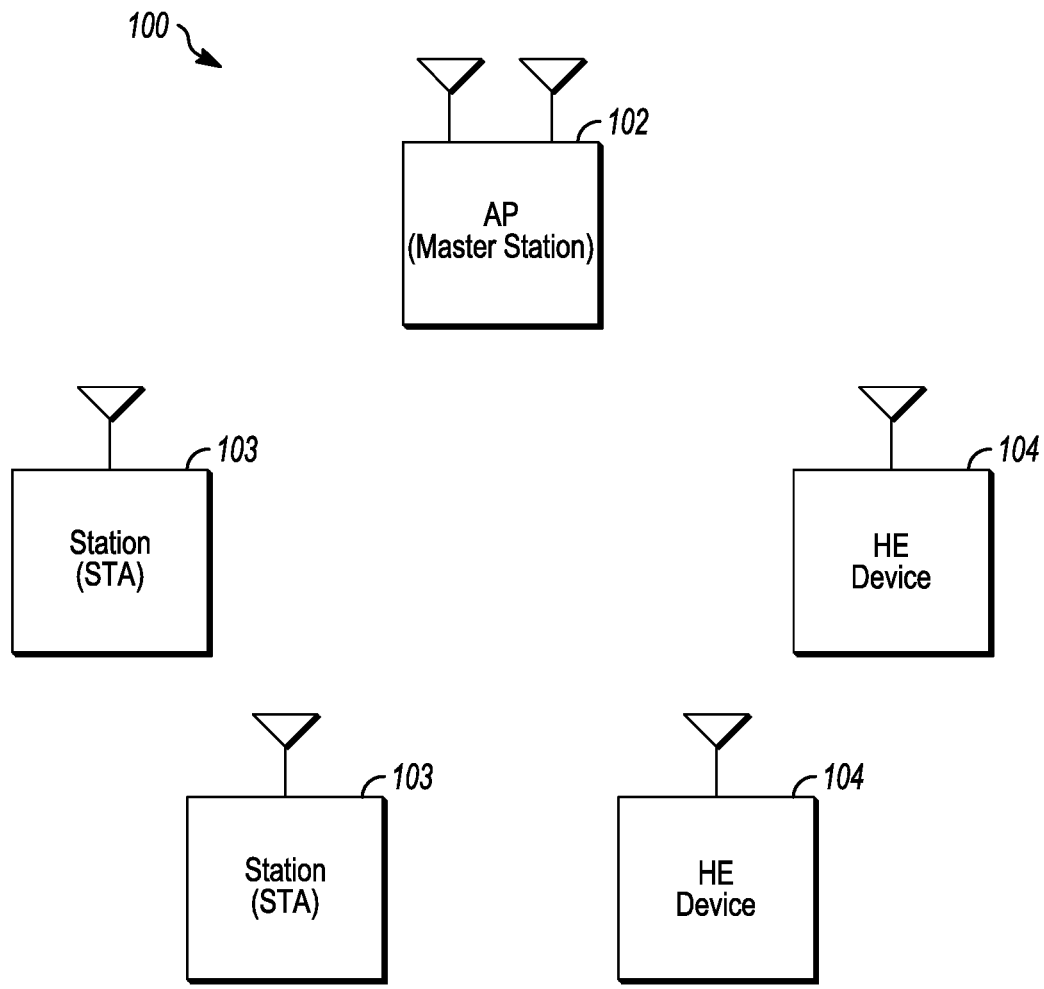
FIG. 1 illustrates a wireless network in accordance with some embodiments.

FIG. 1 illustrates a wireless network in accordance with some embodiments. In some embodiments, the network 100 may be a High Efficiency (HE) Wireless Local Area Network (WLAN) network. In some embodiments, the network 100 may be a WLAN or a Wi-Fi network. These embodiments are not limiting, however, as some embodiments of the network 100 may include a combination of such networks. That is, the network 100 may support MU operation (for example HE) devices in some cases, non MU operation devices in some cases, and a combination of MU operation devices and non MU operation devices in some cases. Accordingly, it is understood that although techniques described herein may refer to either a non MU operation device or to an MU operation device, such techniques may be applicable to both non MU operation devices and MU operation devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HE devices 104. In some embodiments, the AP 102 may receive and/or detect signals from one or more STAs 103, and may transmit data packets to one or more STAs 103. These embodiments will be described in more detail below.

It should be noted that references may be made to performance of one or more techniques, operations and/or methods by an STA 103, but such references are not limiting. In some embodiments, an HE device 104 may perform one or more of those techniques, operations and/or methods.

The AP 102 may be arranged to communicate with one or more of the components shown in FIG. 1 in accordance with one or more IEEE 802.11 standards (including 802.11ax, 802.11az and/or others), other standards and/or other communication protocols. It should be noted that embodiments are not limited to usage of an AP 102. References herein to the AP 102 are not limiting and references herein to the master station 102 are also not limiting. In some embodiments, a STA 103, an MU operation device (device capable of MU operation), an HE device 104 and/or other device may be configurable to operate as a master station. Accordingly, in such embodiments, operations that may be performed by the AP 102 as described herein may be performed by the STA 103, an MU operation device, an HE device 104 and/or other device that is configurable to operate as the master station.

In some embodiments, one or more of the STAs 103 may be legacy stations (for instance, a non MU operation device and/or device not capable of MU operation). These embodiments are not limiting, however, as the STAs 103 may be configured to operate as MU operation devices, HE devices 104 or may support MU operation or may support HE operation, in some embodiments. The master station 102 may be arranged to communicate with the STAs 103 and/or the HE stations and/or the MU operation stations in accordance with one or more of the IEEE 802.11 standards, including 802.11ax, 802.11az and/or others. In accordance with some HE operation embodiments and/or MU operation embodiments, an access point (AP) may operate as the master station 102 and may be arranged to contend for a wireless medium (e.g., during a contention period) to receive exclusive control of the medium for an 802.11 air access control period (i.e., a transmission opportunity (TXOP)). The master station 102 may, for example, transmit a master-sync or control transmission at the beginning of the 802.11 air access control period (including but not limited to an HE control period) to indicate, among other things, which MU operation stations and/or HE stations 104 are scheduled for communication during the 802.11 air access control period. During the 802.11 air access control period, the scheduled MU operation stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the 802.11 air access control period, the master station 102 may communicate with HE stations 104 using one or more MU PPDUs. During the 802.11 air access control period, STAs 103 not operating as MU operation devices may refrain from communicating in some cases. In some embodiments, the master-sync transmission may be referred to as a control and schedule transmission.

In some embodiments, the multiple-access technique used during the 802.11 air access control period may be a scheduled orthogonal frequency-division multiple access (OFDMA) technique, although this is not a requirement. In some embodiments, the multiple access technique may be a time-division multiple access (TDMA) technique or a frequency-division multiple access (FDMA) technique. In some embodiments, the multiple access technique may be a space-division multiple access (SDMA) technique including a multi-user (MU) multiple-input multiple-output (MIMO) (MU-MIMO) technique or combination of the above. These multiple-access techniques used during the 802.11 air access control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the MU operation stations and/or HE stations 104 outside the 802.11 air access control period in accordance with legacy IEEE 802.11 communication techniques, although this is not a requirement.

In some embodiments, the MU communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an MU communication may be configured for transmitting a number of spatial streams.

In some embodiments, MU techniques may be used, although the scope of embodiments is not limited in this respect. As an example, techniques included in 802.11ax standards, 802.11az standards and/or other standards may be used. In accordance with some embodiments, a master station 102 and/or MU operation stations and/or HE stations 104 may generate an MU packet in accordance with a short preamble format or a long preamble format. The MU packet may comprise a legacy signal field (L-SIG) followed by one or more MU signal fields (HE-SIG) and an MU long-training field (MU-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

In some embodiments, the STAs 103, AP 102, HE devices 104, other mobile devices, other base stations and/or other devices may be configured to perform operations related to contention based communication. As an example, communication between the STAs 103 and/or AP 102 and/or communication between the STAs 103 may be performed in accordance with contention based techniques. In such cases, the STAs 103, HE devices 104 and/or AP 102 may be arranged to contend for a wireless medium (e.g., during a contention period) to receive exclusive control of the medium for a transmission period. For instance, the transmission period may include a transmission opportunity (TXOP), which may be included in an 802.11 standard and/or other standard.

It should be noted that embodiments are not limited to usage of contention based techniques, however, as some communication (such as that between mobile devices and/or communication between a mobile device and a base station) may be performed in accordance with schedule based techniques. Some embodiments may include a combination of contention based techniques and schedule based techniques.

In some embodiments, the communication between mobile devices and/or between a mobile device and a base station may be performed in accordance with single carrier techniques. As an example, a protocol data unit (PDU) and/or other frame(s) may be modulated on a single carrier frequency in accordance with a single carrier modulation (SCM) technique. In some embodiments, the communication between mobile devices and/or between a mobile device and a base station may be performed in accordance with any suitable multiple-access techniques and/or multiplexing techniques. Accordingly, one or more of orthogonal frequency division multiple access (OFDMA), orthogonal frequency division multiplexing (OFDM), code-division multiple access (CDMA), time-division multiple access (TDMA), frequency division multiplexing (FDMA), space-division multiple access (SDMA), multiple-input multiple-output (MIMO), multi-user (MU) multiple-input multiple-output (MIMO) (MU-MIMO) and/or other techniques may be employed in some embodiments.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
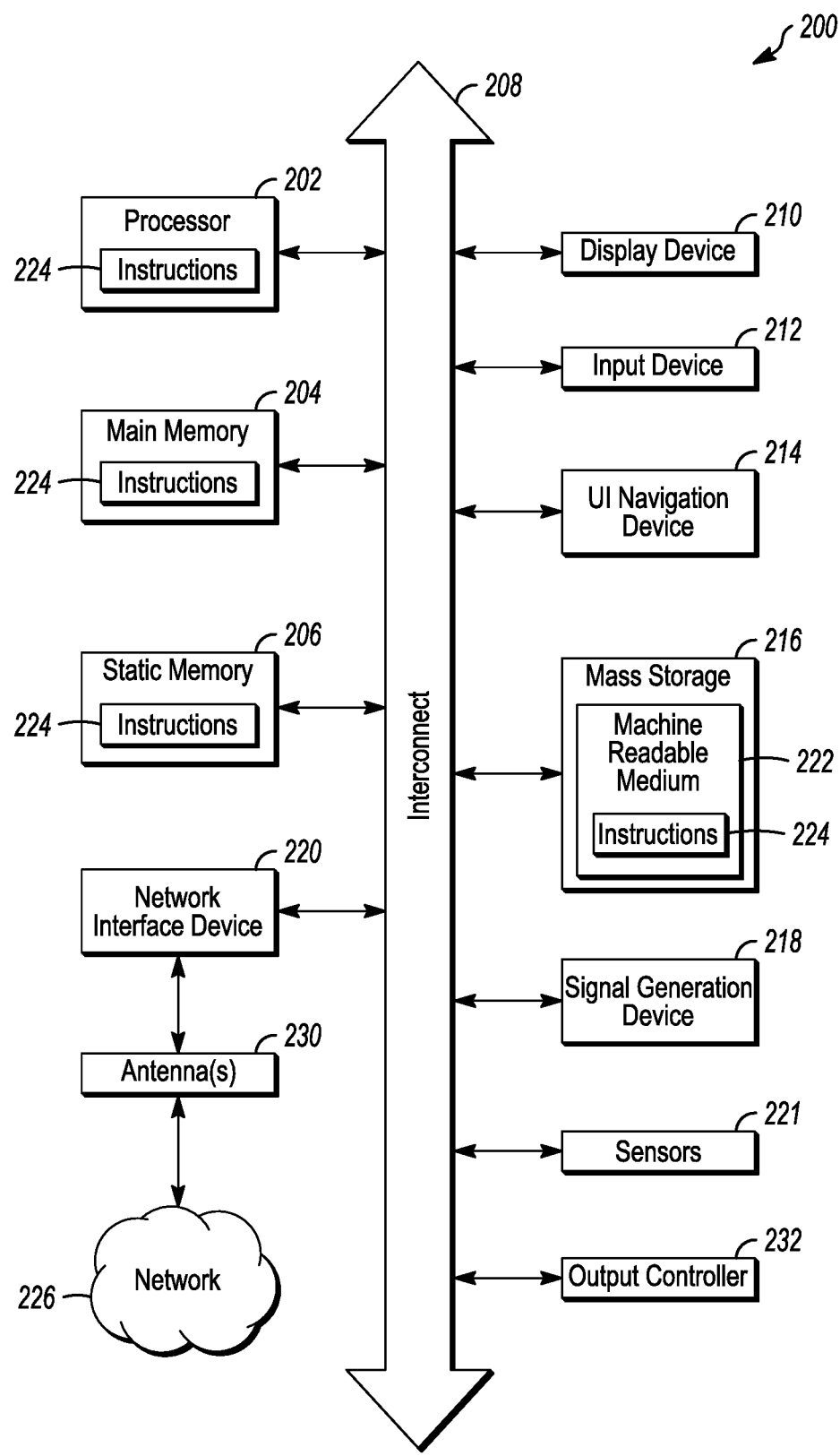
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, an STA STA 103, User Equipment (UE), Evolved Node-B (eNB), mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display device 210, an alphanumeric input device 212 (e.g., a keyboard), and a user interface (UI) navigation device 214 (e.g., a mouse). In an example, the display device 210, input device 212 and UI navigation device 214 may be a touch screen display. The machine 200 may additionally include mass storage 216 (such as a storage device, drive unit and/or other), a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the mass storage 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
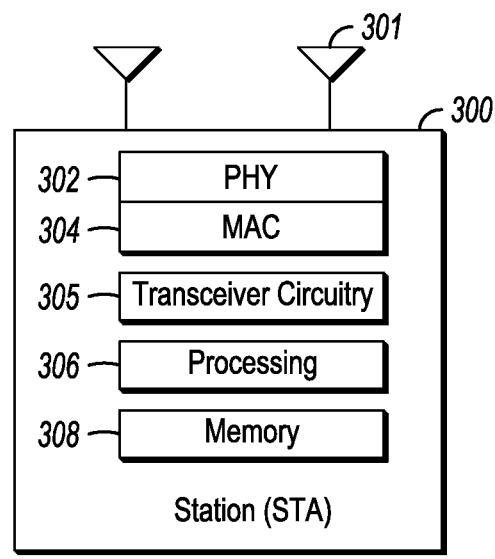
FIG. 3 illustrates a station (STA) in accordance with some embodiments and an access point (AP) in accordance with some embodiments.
Figure 3:
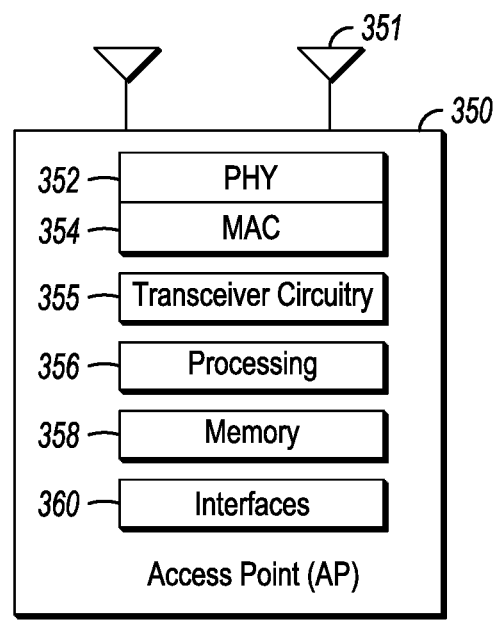

FIG. 3 illustrates a station (STA) in accordance with some embodiments and an access point (AP) in accordance with some embodiments. It should be noted that in some embodiments, an STA or other mobile device may include one or more components shown in any of FIG. 2, FIG. 3 (as in 300) or FIGS. 4-7. In some embodiments, the STA 300 may be suitable for use as an STA 103 as depicted in FIG. 1, although the scope of embodiments is not limited in this respect. It should also be noted that in some embodiments, an AP or other base station may include one or more components shown in any of FIG. 2, FIG. 3 (as in 350) or FIGS. 4-7. In some embodiments, the AP 350 may be suitable for use as an AP 102 as depicted in FIG. 1, although the scope of embodiments is not limited in this respect.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control (MAC) layer circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control (MAC) layer circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured to communicate using OFDM and/or OFDMA communication signals over a multicarrier communication channel. In some embodiments, the AP 350 may be configured to communicate using OFDM and/or OFDMA communication signals over a multicarrier communication channel. Accordingly, in some cases, the STA 300 and/or AP 350 may be configured to receive signals in accordance with specific communication standards, such as the Institute of Electrical and Electronics Engineers (IEEE) standards including IEEE 802.11-2012, 802.11n-2009, 802.11ac-2013 standards, 802.11ax standards (and/or proposed standards), 802.11ay standards (and/or proposed standards) and/or other, although the scope of the embodiments is not limited in this respect as they may also be suitable to transmit and/or receive communications in accordance with other techniques and standards. In some other embodiments, the AP 350 and/or the STA 300 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the STA 300 may include various components of the STA 300 as shown in FIG. 3 and/or the example machine 200 as shown in FIG. 2 and/or various components shown in FIGS. 4-7. Accordingly, techniques and operations described herein that refer to the STA 300 (or 103) may be applicable to an apparatus of an STA, in some embodiments. It should also be noted that in some embodiments, an apparatus of the AP 350 may include various components of the AP 350 as shown in FIG. 3 and/or the example machine 200 as shown in FIG. 2 and/or various components shown in FIGS. 4-7. Accordingly, techniques and operations described herein that refer to the AP 350 (or 102) may be applicable to an apparatus of an AP, in some embodiments. In addition, an apparatus of a mobile device and/or base station may include one or more components shown in FIGS. 2-7, in some embodiments. Accordingly, techniques and operations described herein that refer to a mobile device and/or base station may be applicable to an apparatus of a mobile device and/or base station, in some embodiments.

Figure 4:
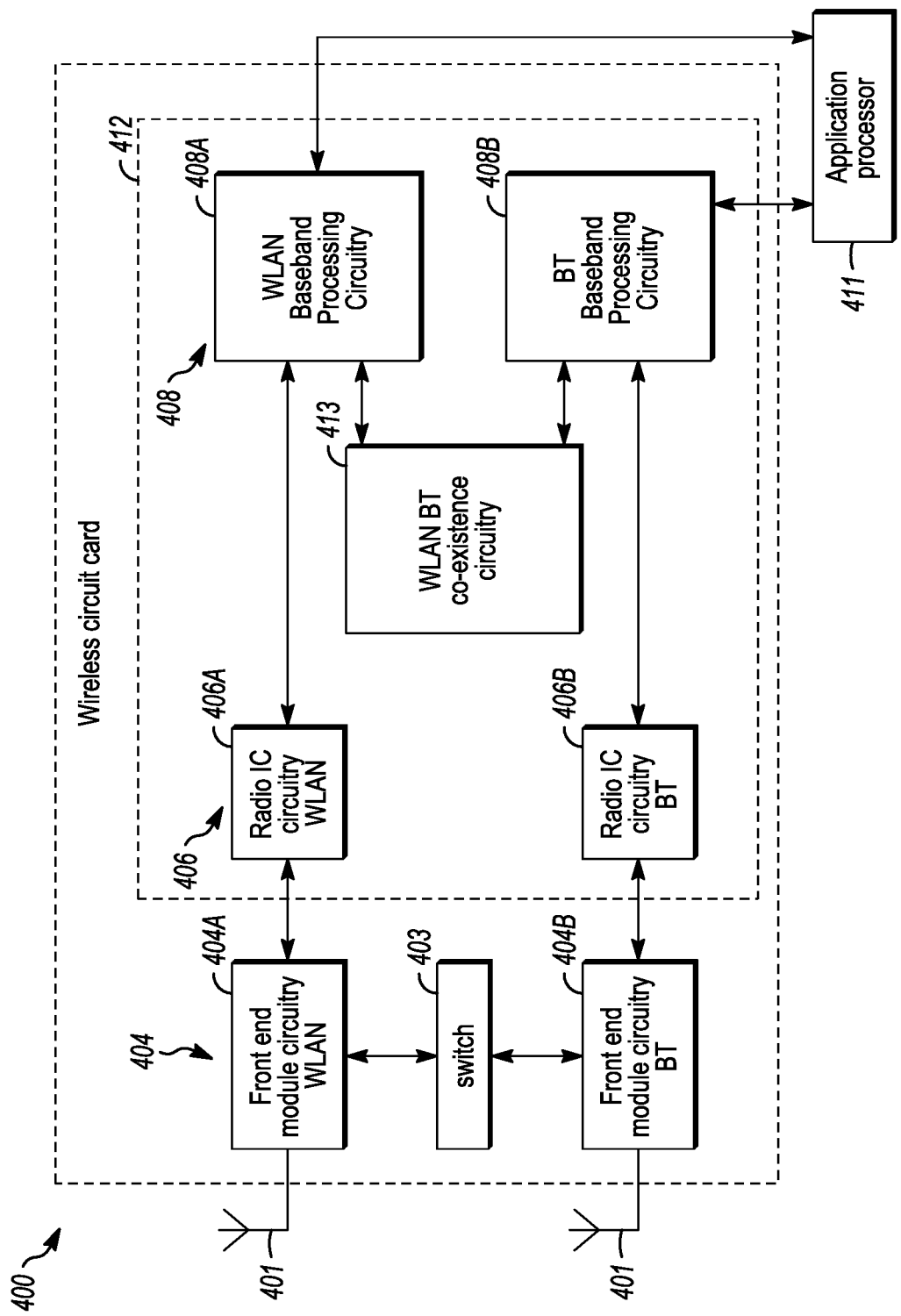
FIG. 4 is a block diagram of a radio architecture in accordance with some embodiments.

FIG. 4 is a block diagram of a radio architecture 400 in accordance with some embodiments. Radio architecture 400 may include radio front-end module (FEM) circuitry 404, radio IC circuitry 406 and baseband processing circuitry 408. Radio architecture 400 as shown includes both Wireless Local Area Network (WLAN) functionality and Bluetooth (BT) functionality although embodiments are not so limited. In this disclosure, "WLAN" and "Wi-Fi" are used interchangeably.

Figure 5:
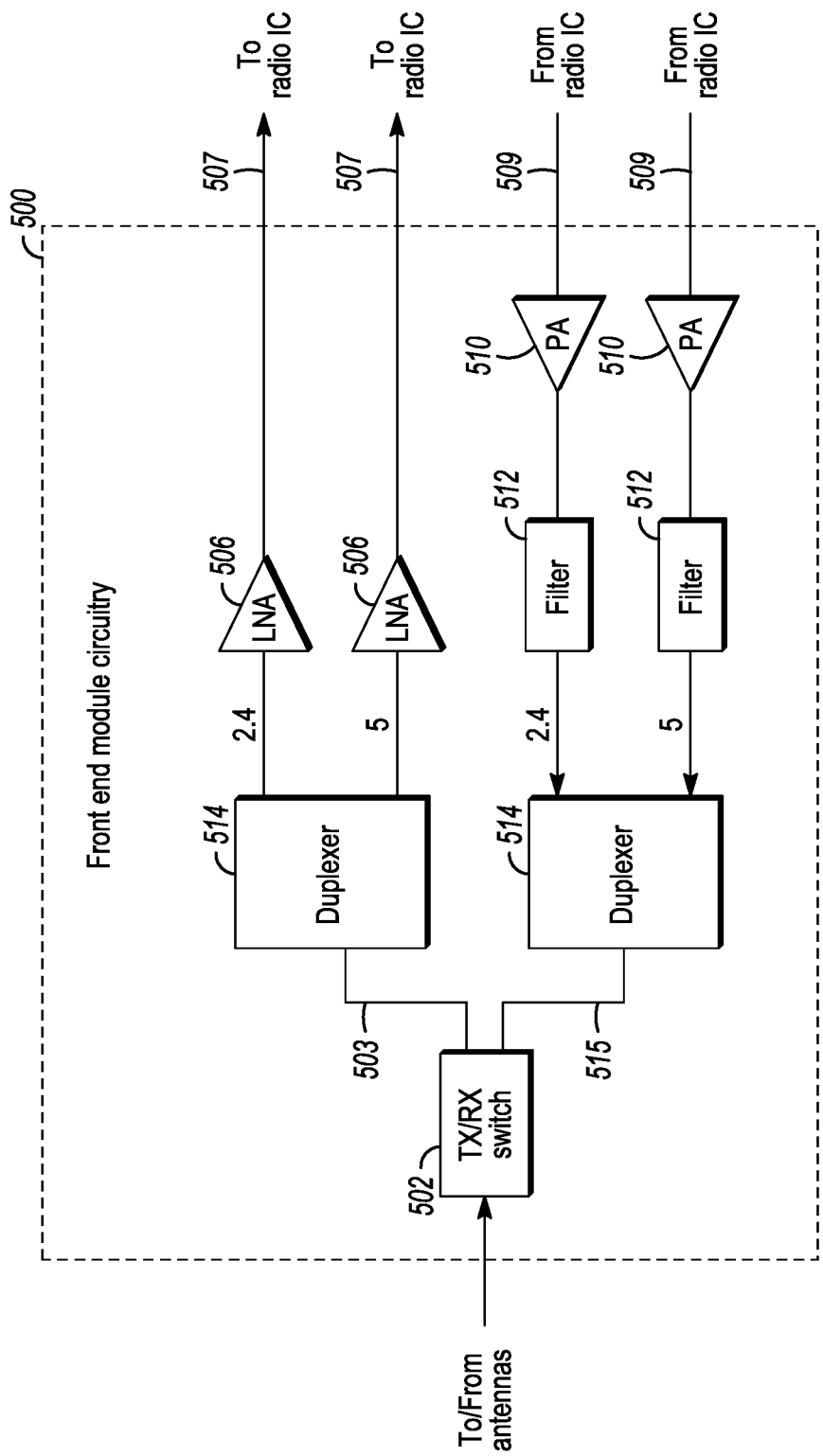
FIG. 5 illustrates a front-end module circuitry for use in the radio architecture of FIG. 4 in accordance with some embodiments.
Figure 6:
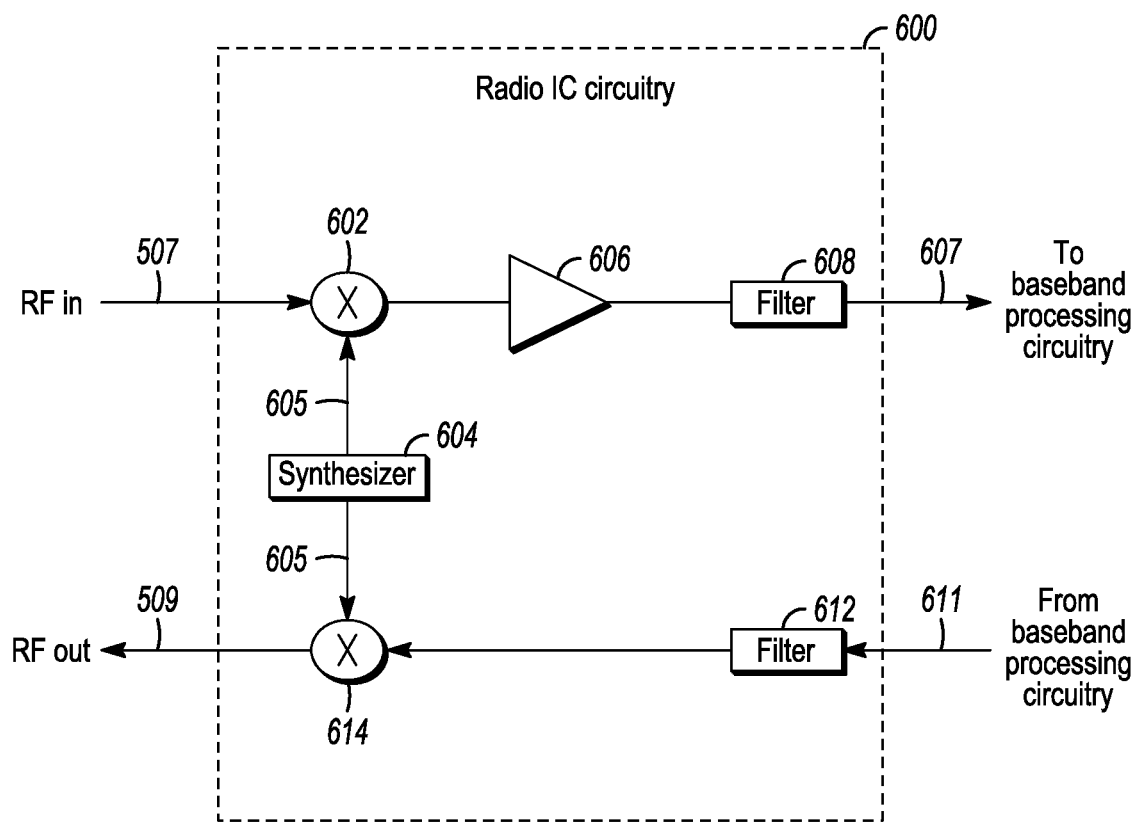
FIG. 6 illustrates a radio IC circuitry for use in the radio architecture of FIG. 4 in accordance with some embodiments.
Figure 7:
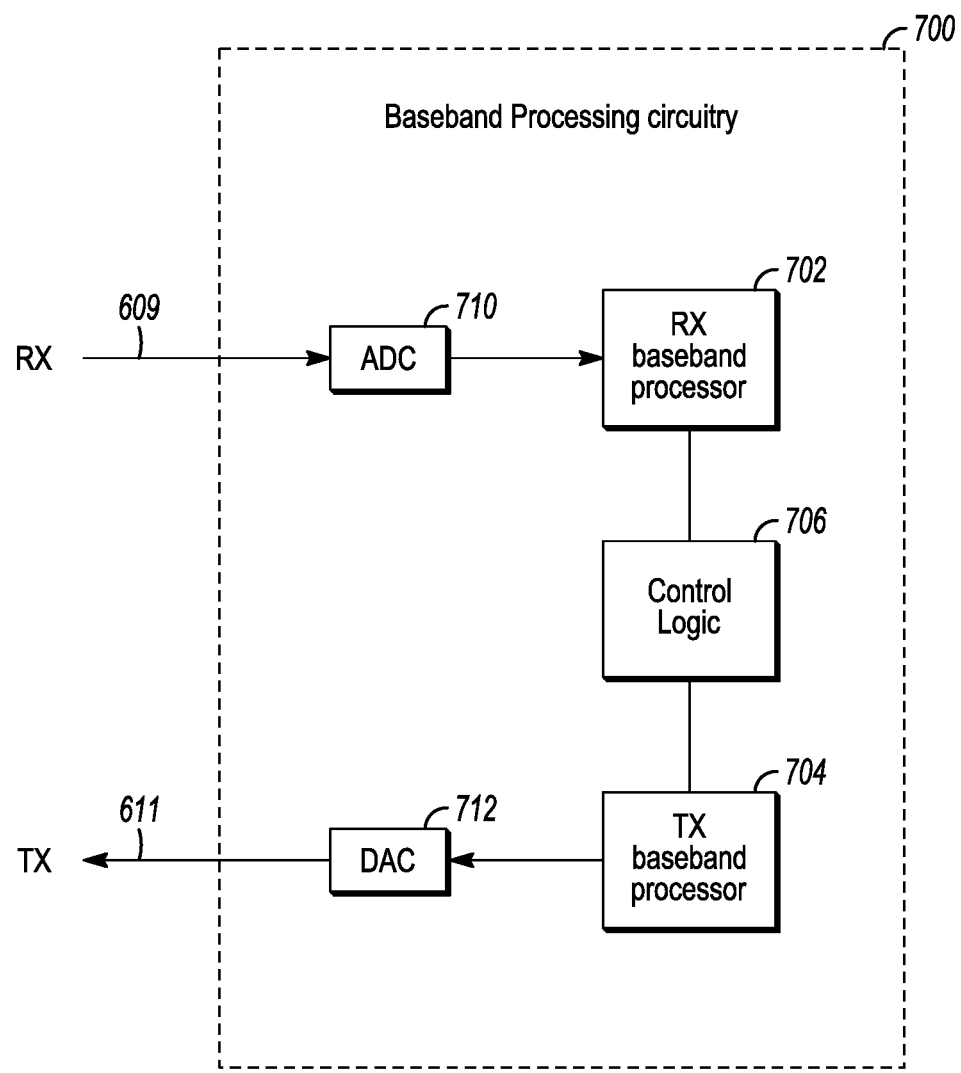
FIG. 7 illustrates a baseband processing circuitry for use in the radio architecture of FIG. 4 in accordance with some embodiments.

It should be noted that the radio architecture 400 and components shown in FIGS. 5-7 support WLAN and BT, but embodiments are not limited to WLAN or BT. In some embodiments, two technologies supported by the radio architecture 400 may or may not include WLAN or BT. Other technologies may be supported. In some embodiments, WLAN and a second technology may be supported. In some embodiments, BT and a second technology may be supported. In some embodiments, two technologies other than WLAN and BT may be supported. In addition, the radio architecture 400 may be extended to support more than two protocols, technologies and/or standards, in some embodiments. Embodiments are also not limited to the frequencies illustrated in FIGS. 4-7.

FEM circuitry 404 may include a WLAN or Wi-Fi FEM circuitry 404A and a Bluetooth (BT) FEM circuitry 404B. The WLAN FEM circuitry 404A may include a receive signal path comprising circuitry configured to operate on WLAN RF signals received from one or more antennas 401, to amplify the received signals and to provide the amplified versions of the received signals to the WLAN radio IC circuitry 406A for further processing. The BT FEM circuitry 404B may include a receive signal path which may include circuitry configured to operate on BT RF signals received from one or more antennas 401, to amplify the received signals and to provide the amplified versions of the received signals to the BT radio IC circuitry 406B for further processing. FEM circuitry 404A may also include a transmit signal path which may include circuitry configured to amplify WLAN signals provided by the radio IC circuitry 406A for wireless transmission by one or more of the antennas 401. In addition, FEM circuitry 404B may also include a transmit signal path which may include circuitry configured to amplify BT signals provided by the radio IC circuitry 406b for wireless transmission by the one or more antennas. In the embodiment of FIG. 4, although FEM 404A and FEM 404B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 406 as shown may include WLAN radio IC circuitry 406A and BT radio IC circuitry 406B. The WLAN radio IC circuitry 406A may include a receive signal path which may include circuitry to down-convert WLAN RF signals received from the FEM circuitry 404A and provide baseband signals to WLAN baseband processing circuitry 408a. BT radio IC circuitry 406B may in turn include a receive signal path which may include circuitry to down-convert BT RF signals received from the FEM circuitry 404B and provide baseband signals to BT baseband processing circuitry 408B. WLAN radio IC circuitry 406A may also include a transmit signal path which may include circuitry to up-convert WLAN baseband signals provided by the WLAN baseband processing circuitry 408A and provide WLAN RF output signals to the FEM circuitry 404A for subsequent wireless transmission by the one or more antennas 401. BT radio IC circuitry 406B may also include a transmit signal path which may include circuitry to up-convert BT baseband signals provided by the BT baseband processing circuitry 408B and provide BT RF output signals to the FEM circuitry 404B for subsequent wireless transmission by the one or more antennas 401. In the embodiment of FIG. 4, although radio IC circuitries 406A and 406B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 408 may include a WLAN baseband processing circuitry 408A and a BT baseband processing circuitry 408B. The WLAN baseband processing circuitry 408A may include a memory, such as, for example, a set of RAM arrays in a Fast Fourier Transform or Inverse Fast Fourier Transform block (not shown) of the WLAN baseband processing circuitry 408A. Each of the WLAN baseband circuitry 408A and the BT baseband circuitry 408B may further include one or more processors and control logic to process the signals received from the corresponding WLAN or BT receive signal path of the radio IC circuitry 406, and to also generate corresponding WLAN or BT baseband signals for the transmit signal path of the radio IC circuitry 406. Each of the baseband processing circuitries 408A and 408B may further include physical layer (PHY) and medium access control layer (MAC) circuitry, and may further interface with application processor 411 for generation and processing of the baseband signals and for controlling operations of the radio IC circuitry 406.

Referring still to FIG. 4, according to the shown embodiment, WLAN-BT coexistence circuitry 413 may include logic providing an interface between the WLAN baseband circuitry 408A and the BT baseband circuitry 408B to enable use cases requiring WLAN and BT coexistence. In addition, a switch 403 may be provided between the WLAN FEM circuitry 404A and the BT FEM circuitry 404B to allow switching between the WLAN and BT radios according to application needs. In addition, although the antennas 401 are depicted as being respectively connected to the WLAN FEM circuitry 404A and the BT FEM circuitry 404B, embodiments include within their scope the sharing of one or more antennas as between the WLAN and BT FEMs, or the provision of more than one antenna connected to each of FEM 404A or 404B.

In some embodiments, the front-end module circuitry 404, the radio IC circuitry 406, and baseband processing circuitry 408 may be provided on a single radio card, such as wireless radio card 402. In some other embodiments, the one or more antennas 401, the FEM circuitry 404 and the radio IC circuitry 406 may be provided on a single radio card. In some other embodiments, the radio IC circuitry 406 and the baseband processing circuitry 408 may be provided on a single chip or integrated circuit (IC), such as IC 412.

In some embodiments, the wireless radio card 402 may include a WLAN radio card and may be configured for Wi-Fi communications, although the scope of the embodiments is not limited in this respect. In some of these embodiments, the radio architecture 400 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 400 may be part of an STA, a Wi-Fi communication station (STA) such as a wireless access point (AP), a base station or a mobile device including a Wi-Fi device. In some of these embodiments, radio architecture 400 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 400 may also be suitable to transmit and/or receive communications in accordance with other techniques and standards.

In some embodiments, the radio architecture 400 may be configured for high-efficiency (HE) Wi-Fi (HEW) communications in accordance with the IEEE 802.11ax standard. In these embodiments, the radio architecture 400 may be configured to communicate in accordance with an OFDMA technique, although the scope of the embodiments is not limited in this respect.

In some other embodiments, the radio architecture 400 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 4, the BT baseband circuitry 408B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 4, the radio architecture 400 may be configured to establish a BT synchronous connection oriented (SCO) link and/or a BT low energy (BT LE) link. In some of the embodiments that include functionality, the radio architecture 400 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 4, the functions of a BT radio card and WLAN radio card may be combined on a single wireless radio card, such as single wireless radio card 402, although embodiments are not so limited, and include within their scope discrete WLAN and BT radio cards.

In some embodiments, the radio-architecture 400 may include other radio cards, such as a cellular radio card configured for cellular (e.g., 3GPP such as LTE, LTE-Advanced or 5G communications).

In some IEEE 802.11 embodiments, the radio architecture 400 may be configured for communication over various channel bandwidths including bandwidths having center frequencies of about 900 MHz, 2.4 GHz, 5 GHz. In some embodiments, the bandwidths may be about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. In some embodiments, the bandwidths may be about 2.16 GHz, 4.32 GHz, 6.48 GHz, 8.72 GHz and/or other suitable value. The scope of the embodiments is not limited with respect to the above center frequencies or bandwidths, however.

FIG. 5 illustrates FEM circuitry 500 in accordance with some embodiments. The FEM circuitry 500 is one example of circuitry that may be suitable for use as the WLAN and/or BT FEM circuitry 404A/404B (FIG. 4), although other circuitry configurations may also be suitable.

In some embodiments, the FEM circuitry 500 may include a TX/RX switch 502 to switch between transmit mode and receive mode operation. The FEM circuitry 500 may include a receive signal path and a transmit signal path. The receive signal path of the FEM circuitry 500 may include a low-noise amplifier (LNA) 506 to amplify received RF signals 503 and provide the amplified received RF signals 507 as an output (e.g., to the radio IC circuitry 406 (FIG. 4)). The transmit signal path of the circuitry 500 may include a power amplifier (PA) 510 to amplify input RF signals 509 (e.g., provided by the radio IC circuitry 406), and one or more filters 512, such as band-pass filters (BPFs), low-pass filters (LPFs) or other types of filters, to generate RF signals 515 for subsequent transmission (e.g., by one or more of the antennas 401 (FIG. 4)).

In some dual-mode embodiments for Wi-Fi communication, the FEM circuitry 500 may be configured to operate in either the 2.4 GHz frequency spectrum or the 5 GHz frequency spectrum. In these embodiments, the receive signal path of the FEM circuitry 500 may include a receive signal path duplexer 504 to separate the signals from each spectrum as well as provide a separate LNA 506 for each spectrum as shown. In these embodiments, the transmit signal path of the FEM circuitry 500 may also include a power amplifier 510 and a filter 512, such as a BPF, a LPF or another type of filter for each frequency spectrum and a transmit signal path duplexer 514 to provide the signals of one of the different spectrums onto a single transmit path for subsequent transmission by the one or more of the antennas 401 (FIG. 4). In some embodiments, BT communications may utilize the 2.4 GHZ signal paths and may utilize the same FEM circuitry 500 as the one used for WLAN communications.

FIG. 6 illustrates radio IC circuitry 600 in accordance with some embodiments. The radio IC circuitry 600 is one example of circuitry that may be suitable for use as the WLAN or BT radio IC circuitry 406A/406B (FIG. 4), although other circuitry configurations may also be suitable.

In some embodiments, the radio IC circuitry 600 may include a receive signal path and a transmit signal path. The receive signal path of the radio IC circuitry 600 may include at least mixer circuitry 602, such as, for example, down-conversion mixer circuitry, amplifier circuitry 606 and filter circuitry 608. The transmit signal path of the radio IC circuitry 600 may include at least filter circuitry 612 and mixer circuitry 614, such as, for example, up-conversion mixer circuitry. Radio IC circuitry 600 may also include synthesizer circuitry 604 for synthesizing a frequency 605 for use by the mixer circuitry 602 and the mixer circuitry 614. The mixer circuitry 602 and/or 614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 6 illustrates only a simplified version of a radio IC circuitry, and may include, although not shown, embodiments where each of the depicted circuitries may include more than one component. For instance, mixer circuitry 602 and/or 614 may each include one or more mixers, and filter circuitries 608 and/or 612 may each include one or more filters, such as one or more BPFs and/or LPFs according to application needs. For example, when mixer circuitries are of the direct-conversion type, they may each include two or more mixers.

In some embodiments, mixer circuitry 602 may be configured to down-convert RF signals 507 received from the FEM circuitry 404 (FIG. 4) based on the synthesized frequency 605 provided by synthesizer circuitry 604. The amplifier circuitry 606 may be configured to amplify the down-converted signals and the filter circuitry 608 may include a LPF configured to remove unwanted signals from the down-converted signals to generate output baseband signals 607. Output baseband signals 607 may be provided to the baseband processing circuitry 408 (FIG. 4) for further processing. In some embodiments, the output baseband signals 607 may be zero-frequency baseband signals, although this is not a requirement. In some embodiments, mixer circuitry 602 may comprise passive mixers, although the scope of the embodiments is not limited in this respect.

In some embodiments, the mixer circuitry 614 may be configured to up-convert input baseband signals 611 based on the synthesized frequency 605 provided by the synthesizer circuitry 604 to generate RF output signals 509 for the FEM circuitry 404. The baseband signals 611 may be provided by the baseband processing circuitry 408 and may be filtered by filter circuitry 612. The filter circuitry 612 may include a LPF or a BPF, although the scope of the embodiments is not limited in this respect.

In some embodiments, the mixer circuitry 602 and the mixer circuitry 614 may each include two or more mixers and may be arranged for quadrature down-conversion and/or up-conversion respectively with the help of synthesizer 604. In some embodiments, the mixer circuitry 602 and the mixer circuitry 614 may each include two or more mixers each configured for image rejection (e.g., Hartley image rejection). In some embodiments, the mixer circuitry 602 and the mixer circuitry 614 may be arranged for direct down-conversion and/or direct up-conversion, respectively. In some embodiments, the mixer circuitry 602 and the mixer circuitry 614 may be configured for super-heterodyne operation, although this is not a requirement.

Mixer circuitry 602 may comprise, according to one embodiment: quadrature passive mixers (e.g., for the in-phase (I) and quadrature phase (Q) paths). In such an embodiment, RF input signal 507 from FIG. 6 may be down-converted to provide I and Q baseband output signals to be sent to the baseband processor.

Quadrature passive mixers may be driven by zero and ninety degree time-varying LO switching signals provided by a quadrature circuitry which may be configured to receive a LO frequency (fLo) from a local oscillator or a synthesizer, such as LO frequency 605 of synthesizer 604 (FIG. 6). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 507 (FIG. 5) may comprise a balanced signal, although the scope of the embodiments is not limited in this respect. The I and Q baseband output signals may be provided to low-nose amplifier, such as amplifier circuitry 606 (FIG. 6) or to filter circuitry 608 (FIG. 6).

In some embodiments, the output baseband signals 607 and the input baseband signals 611 may be analog baseband signals, although the scope of the embodiments is not limited in this respect. In some alternate embodiments, the output baseband signals 607 and the input baseband signals 611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 604 may be a fractional-N synthesizer or a fractional N/N+1 synthesizer, although the scope of the embodiments is not limited in this respect as other types of frequency synthesizers may be suitable. For example, synthesizer circuitry 604 may be a delta-sigma synthesizer, a frequency multiplier, or a synthesizer comprising a phase-locked loop with a frequency divider. According to some embodiments, the synthesizer circuitry 604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 604 may be provided by a voltage controlled oscillator (VCO), although that is not a requirement. A divider control input may further be provided by either the baseband processing circuitry 408 (FIG. 4) or the application processor 411 (FIG. 4) depending on the desired output frequency 605. In some embodiments, a divider control input (e.g., N) may be determined from a look-up table (e.g., within a Wi-Fi card) based on a channel number and a channel center frequency as determined or indicated by the application processor 411.

In some embodiments, synthesizer circuitry 604 may be configured to generate a carrier frequency as the output frequency 605, while in other embodiments, the output frequency 605 may be a fraction of the carrier frequency (e.g., one-half the carrier frequency, one-third the carrier frequency). In some embodiments, the output frequency 605 may be a LO frequency (fLo).

FIG. 7 illustrates a functional block diagram of baseband processing circuitry 700 in accordance with some embodiments. The baseband processing circuitry 700 is one example of circuitry that may be suitable for use as the baseband processing circuitry 408 (FIG. 4), although other circuitry configurations may also be suitable. The baseband processing circuitry 700 may include a receive baseband processor (RX BBP) 702 for processing receive baseband signals 609 provided by the radio IC circuitry 406 (FIG. 4) and a transmit baseband processor (TX BBP) 704 for generating transmit baseband signals 611 for the radio IC circuitry 406. The baseband processing circuitry 700 may also include control logic 706 for coordinating the operations of the baseband processing circuitry 700.

In some embodiments (e.g., when analog baseband signals are exchanged between the baseband processing circuitry 700 and the radio IC circuitry 406), the baseband processing circuitry 700 may include ADC 710 to convert analog baseband signals received from the radio IC circuitry 406 to digital baseband signals for processing by the RX BBP 702. In these embodiments, the baseband processing circuitry 700 may also include DAC 712 to convert digital baseband signals from the TX BBP 704 to analog baseband signals.

In some embodiments that communicate OFDM signals or OFDMA signals, such as through baseband processor 408A, the transmit baseband processor 704 may be configured to generate OFDM or OFDMA signals as appropriate for transmission by performing an inverse fast Fourier transform (IFFT). The receive baseband processor 702 may be configured to process received OFDM signals or OFDMA signals by performing an FFT. In some embodiments, the receive baseband processor 702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 4, in some embodiments, the antennas 401 (FIG. 4) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 401 may each include a set of phased-array antennas, although embodiments are not so limited.

Although the radio-architecture 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with some embodiments, the AP 102 may encode, for transmission during a transmission opportunity (TXOP), a trigger frame (TF) to indicate that an STA 103 is to transmit an uplink sounding packet during an uplink sounding period of the TXOP. The AP 102 may attempt to detect the uplink sounding packet during the uplink sounding period. If the uplink sounding packet is not detected during the uplink sounding period, the AP may encode, for transmission during the uplink sounding period, a recovery packet to cause other STAs 103 to determine a busy condition during the uplink sounding period. If the uplink sounding packet is detected during the uplink sounding period, the AP 102 may determine a channel estimate for the STA 103 based at least partly on the uplink sounding packet. These embodiments are described in more detail below.

Figure 8:
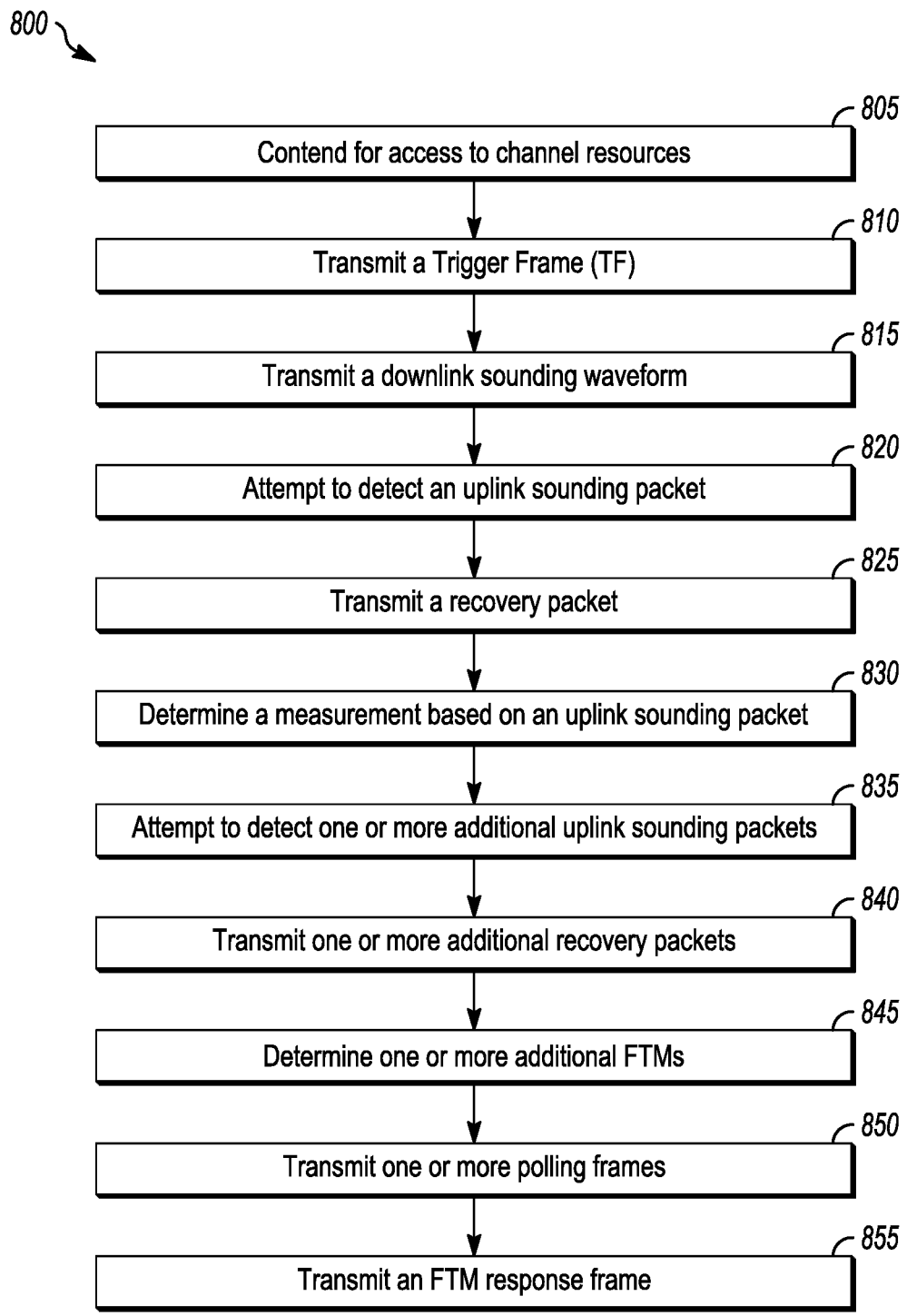
FIG. 8 illustrates the operation of a method of communication in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. Some embodiments of the method 800 may not necessarily include all operations shown in FIG. 8. In addition, embodiments of the method 800 are not necessarily limited to the chronological order that is shown in FIG. 8. In describing the method 800, reference may be made to FIGS. 1-7 and 9-14, although it is understood that the method 800 may be practiced with any other suitable systems, interfaces and components.

In addition, the method 800 and other methods described herein may be applicable to STAs 103 and/or APs 102 operating in accordance with an 802.11 standard, protocol and/or specification and/or WLAN standard, protocol and/or specification, in some cases. In some embodiments, one or more of the operations of the method 800 may be practiced by an IoT STA 103, an STA and/or other mobile device, although the scope of embodiments is not limited in this respect. Embodiments are not limited to STAs 103 or APs 102, however, and may be applicable to other devices, such as a User Equipment (UE), an Evolved Node-B (eNB) and/or other device. In addition, the method 800 and other methods described herein may be practiced by wireless devices configured to operate in other suitable types of wireless communication systems, including systems configured to operate according to various Third Generation Partnership Protocol (3GPP) standards, including but not limited to Long Term Evolution (LTE). The method 800 may also be practiced by an apparatus of an STA 103, an apparatus of a mobile device and/or an apparatus of another device, in some embodiments.

It should also be noted that embodiments are not limited by references herein (such as in descriptions of the methods 800, 1400 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

It should be noted that references herein to an STA 103 are not limiting. In some embodiments, an HE device (such as 104) and/or other mobile device may perform one or more operations of an STA 103 described herein. In some embodiments, an STA (and/or other mobile device) may perform one or more operations described herein without explicit operation as an HE device 104. In some embodiments, the method 800 may be performed by an STA 103. In some embodiments, the method 800 may be performed by an STA configured to operate as an HE device 104. In some embodiments, the method 800 may be performed by an STA 103 arranged to operate in accordance with one or more HE protocols and/or HE standards (including but not limited to 802.11ax, 802.11az and/or other). The scope of embodiments is not limited in this respect, however, as any suitable device may perform the method 800, in some embodiments.

At operation 805 of the method 800, the AP 102 may contend for a transmission opportunity (TXOP) to obtain access to a channel. In some embodiments, the AP 102 may contend for a TXOP during which the AP 102 is to control access to the channel. In some embodiments, the AP 102 may contend for a wireless medium during a contention period to receive exclusive control of the medium during a period, including but not limited to a TXOP and/or HE control period. The AP 102 may transmit, receive and/or schedule one or more frames and/or signals during the period. The AP 102 may transmit and/or receive one or more frames and/or signals during the period. However, it should be noted that embodiments are not limited to scheduled transmission/reception or to transmission/reception in accordance with the exclusive control of the medium. Accordingly, an MPDU, PPDU, BA frame and/or other frame may be transmitted/received in contention-based scenarios and/or other scenarios, in some embodiments.

Any suitable contention methods, operations and/or techniques may be used, which may or may not be part of a standard. In a non-limiting example, one or more contention methods, operations and/or techniques of an 802.11 standard/protocol and/or W-LAN standard/protocol may be used. It should be noted that embodiments are not limited to usage of contention based techniques. Some embodiments may not necessarily use contention based access.

At operation 810, the AP 102 may transmit a trigger frame (TF). In some embodiments, the TF may be transmitted during the TXOP. In some embodiments, the TF may indicate that an STA 103 is to transmit an uplink sounding packet during an uplink sounding period of the TXOP. It should be noted that multiple uplink sounding periods may be used, in some cases. In some embodiments, the TF may indicate that one or more STAs 103 are to transmit one or more uplink sounding packets during one or more uplink sounding periods of the TXOP. In some embodiments, the TF may indicate that a plurality of STAs 103 are to transmit uplink sounding packets during the TXOP. In some embodiments, the TF may indicate each of one or more STAs 103 that are to transmit an uplink sounding packet during an uplink sounding period of the TXOP.

In a non-limiting example, the TF may indicate that a first STA 103 is to transmit a first uplink sounding packet during a first uplink sounding period of the TXOP. The TF may further indicate that a second STA 103 is to transmit a second uplink sounding packet during a second uplink sounding period of the TXOP, wherein the second uplink sounding period is later than the first uplink sounding period. Embodiments are not limited to the first and second STAs 103, however, as this example may be extended to any number of STAs 103.

In some embodiments, the TF may include information related to sounding operation(s). In some embodiments, the TF may be transmitted to initiate one or more sounding operation(s). As part of the sounding operation(s), one or more timing measurements, location measurements, channel state information (CSI) measurements and/or other measurements may be performed. In some embodiments, the TF may be transmitted to initiate a multi-user (MU) location measurement during the TXOP. As part of the MU location measurement, one or more location measurements for one or more STAs 103 may be determined. Such location measurements may be based on distances between the AP 102 and the STAs 103, angles of arrival between the AP 102 and the STAs 103, time-of-flight (ToF) between the AP 102 and the STAs 103 and/or other.

In some embodiments, the TF may indicate information to be used by the STA 103 to exchange one or more frames and/or signals (such as the PPDUs) with the AP 102 during a transmission opportunity (TXOP). Example information of the TF may include, but is not limited to, time resources to be used for transmission and/or reception, channel resources (such as resource units (RUs) and/or other) to be used for transmission and/or reception, identifiers of STAs 103 that are to transmit, identifiers of STAs 103 that are to receive and/or other information. In some embodiments the information of the TF may indicate which STAs 103 are to transmit uplink sounding packets (such as uplink NDPs), time resources (such as time periods, time slots and/or other) for transmission of uplink sounding packets, frequency resources (such as sub-channels, sub-carriers, resource units (RUs) and/or other) to be used for transmission of uplink sounding packets and/or other information. It should be noted that embodiments are not limited to usage of the TF, and some embodiments may not necessarily include the usage of the TF.

In a non-limiting example, the TF may indicate a specific allocation of RUs of the channel to be used by one or more of the STAs 103 for transmission of an uplink sounding packet in accordance with OFDMA. It should be noted that multiple STAs 103 may be supported, in some embodiments. For instance, the TF may allocate one or more RUs to each of multiple STAs for transmission of uplink sounding packets in accordance with OFDMA. Embodiments are not limited to usage of OFDMA, however, as other techniques (such as OFDM and/or other) may be used, in some embodiments.

At operation 815, the AP 102 may transmit a downlink sounding packet. In a non-limiting example, the downlink sounding packet may be transmitted to enable channel estimation at the STAs 103. In some embodiments, the AP 102 may transmit the downlink sounding packet during a downlink sounding period of the TXOP that occurs after transmission of the TF and before the uplink sounding period(s) of the TXOP. Embodiments are not limited to the chronological order just described, however. In some embodiments, the AP 102 may contend for the TXOP to obtain access to a channel and may transmit the downlink sounding packet in the channel.

In some embodiments, the downlink sounding packet may be an NDP packet (such as a downlink NDP packet), although the scope of embodiments is not limited in this respect.

At operation 820, the AP 102 may attempt to detect an uplink sounding packet during an uplink sounding period of the TXOP. In some embodiments, the AP 102 may attempt to detect one or more uplink sounding packets during the uplink sounding period. In some embodiments, the AP 102 may attempt to detect one or more uplink sounding packets during each of multiple uplink sounding periods. In some embodiments, the AP 102 may contend for the TXOP to obtain access to a channel and may monitor the channel for the uplink sounding packet.

In some embodiments, the uplink sounding packet may be an NDP (such as an uplink NDP), although the scope of embodiments is not limited in this respect. Other packets and/or packet types may be used as uplink sounding packets, in some embodiments.

At operation 825, the AP 102 may transmit a recovery packet. In some embodiments, the AP 102 may transmit the recovery packet during a particular uplink sounding period if an uplink sounding packet is not detected during the particular uplink sounding period. It should be noted that some embodiments may not necessarily include all operations. For instance, the AP 102 may not necessarily transmit the recovery packet during the particular uplink sounding period if the uplink sounding packet is detected during the particular uplink sounding period.

In some embodiments, the AP 102 may transmit the recovery packet to cause one or more STAs 103 to determine a busy condition during the particular uplink sounding period. For instance, one or more devices (such as other STA(s) 103, STA(s) 103 not associated with the AP 102, STA(s) 103 not indicated in the TF and/or other device(s)) may monitor the channel during a particular uplink sounding period. The AP 102 may attempt to detect the uplink sounding packet in the channel during the particular uplink sounding period. If the AP 102 does not detect the uplink sounding packet, the AP 102 may transmit the recovery packet to cause one or more devices (such as those mentioned above and/or other(s)) to detect the busy condition during the particular uplink sounding period.

In some cases, the AP 102 may transmit the recovery packet in the channel during the particular uplink sounding period to restrict access to the channel by one or more devices (such as those mentioned above and/or other(s)) during at least the particular uplink sounding period. In some cases, the AP 102 may transmit the recovery packet during the particular uplink sounding period to indicate, to device(s) that may be monitoring the channel, that the channel is busy.

In some embodiments, the AP 102 may determine a length of the recovery packet for which an end time of the recovery packet is later than an end time of an uplink sounding period. In a non-limiting example, the recovery packet may be transmitted during a particular uplink sounding period. The length of the recovery packet may be determined based on a transmission time of the recovery packet (start time, end time and/or other) and an end time of the particular uplink sounding period. For instance, the length of the recovery packet may be selected as a value for which an end time of the recovery packet is after (or the same as) an end time of the particular uplink sounding period. This example is not limiting, as other values for the length of the recovery packet may be used.

In a non-limiting example, the recovery packet may include a legacy preamble that includes a legacy signal (L-SIG) field that includes the length of the recovery packet. In some cases, legacy devices may be able to decode the length field and may determine that the channel is busy for a time period based on the decoded length field.

At operation 830, the AP 102 may determine one or more measurements based on one or more uplink sounding packets. In some embodiments, the AP 102 may detect an uplink sounding packet from a particular STA 103 during a particular uplink sounding period and may determine one or more measurements for the particular STA 103 based at least partly on the detected uplink sounding packet. The measurement(s) may include, but are not limited to one or more of: a channel estimate, a time of arrival (ToA), an angle of arrival (AoA) and/or other. In a non-limiting example, the AP 102 may determine a channel estimate for a particular STA 103 based at least partly on a detected uplink sounding packet from the particular STA 103. The AP 102 may determine a ToA measurement and/or an AoA measurement based at least partly on the channel estimate. The scope of embodiments is not limited by this example. In addition, embodiments are not limited to a single STA 103. The AP 102 may perform one or more of the above operations (and/or other operation(s)) for multiple STAs 103, in some embodiments.

In some embodiments, the AP 102 may detect an uplink sounding packet from each of multiple STAs 103. The AP 102 may determine one or more measurements (including but not limited to a channel estimate, a time of arrival (ToA), an angle of arrival (AoA) and/or other) for each of the multiple STAs 103. In a non-limiting example, the AP 102 may determine a first channel estimate for a first STA 103 based at least partly on a first uplink sounding packet from the first STA 103. The AP 102 may determine a first ToA measurement and/or a first AoA measurement based at least partly on the first channel estimate. In some cases, the AP 102 may determine a second channel estimate for a second STA 103 based at least partly on a second uplink sounding packet from the second STA 103. The AP 102 may determine a second ToA measurement and/or a second AoA measurement based at least partly on the second channel estimate. The scope of embodiments is not limited by this example.

In some embodiments, the AP 102 may determine, for multiple STAs 103, one or more channel estimates, one or more ToA measurements, one or more AoA measurements and/or other measurement(s). The measurements may be based at least partly on uplink sounding packet(s) and/or other packet(s) from the multiple STAs 103.

At operation 835, the AP 102 may attempt to detect one or more additional uplink sounding packets. At operation 840, the AP 102 may transmit one or more additional recovery packets. At operation 845, the AP 102 may determine one or more additional measurements (including but not limited to a channel estimate, AoA, ToA and/or other). In some embodiments, one or more of operations 835-845 may be performed any suitable number of times (including zero, one or more), which may depend on one or more factors, including but not limited to how many STAs 103 are to transmit uplink sounding packets, how many uplink sounding periods are used, whether uplink sounding packet(s) are detected and/or other factors.

In a non-limiting example, the TF may indicate that a first STA 103 is to transmit a first uplink sounding packet during a first uplink sounding period of the TXOP. The TF may further indicate that a second STA 103 is to transmit a second uplink sounding packet during a second uplink sounding period of the TXOP. The second uplink sounding period may be later than the first uplink sounding period.

Continuing the above example, the AP 102 may attempt to detect the first uplink sounding packet during the first uplink sounding period. If the first uplink sounding packet is not detected during the first uplink sounding period, the AP 102 may transmit, during the first uplink sounding period, a first recovery packet. For instance, the AP 102 may transmit the first recovery packet to cause other STAs 103 to detect a busy condition during the first uplink sounding period. If the first uplink sounding packet is detected during the first uplink sounding period, the AP 102 may determine a first measurement (including but not limited to a channel estimate, AoA, ToA and/or other) for the first STA 103 based at least partly on the first uplink sounding packet.

Continuing the above example, the AP 102 may attempt to detect the second uplink sounding packet during the second uplink sounding period. If the second uplink sounding packet is not detected during the second uplink sounding period, the AP 102 may transmit, during the second uplink sounding period, a recovery packet. For instance, the AP 102 may transmit the second recovery packet to cause other STAs 103 to detect a busy condition during the second uplink sounding period. If the second uplink sounding packet is detected during the second uplink sounding period, the AP 102 may determine a second measurement (including but not limited to a channel estimate, AoA, ToA and/or other) for the second STA 103 based at least partly on the second uplink sounding packet.

The above example may be extended to include more than two STAs 103, more than two uplink sounding periods and/or more than two uplink sounding packets.

At operation 850, the AP 102 may transmit a polling frame. For instance, the AP 102 may transmit the polling frame to indicate that a STA 103 is to transmit an uplink sounding packet during an uplink sounding period. In some embodiments, the polling frame may be transmitted during the TXOP, although the scope of embodiments is not limited in this respect. Some embodiments may not necessarily include operation 850.

In some cases, multiple polling frames may be used. In a non-limiting example, the AP 102 may transmit, during a transmission opportunity (TXOP), a trigger frame (TF) to indicate that a plurality of STAs 103 are to transmit uplink sounding packets during the TXOP. The AP 102 may attempt to detect a first uplink sounding packet from a first STA 103 of the plurality during a first uplink sounding period of the TXOP. The AP 102 may transmit, during the TXOP after the first uplink sounding period, a polling frame to indicate that a second STA 103 of the plurality is to transmit a second uplink sounding packet during a second uplink sounding period of the TXOP. The AP 102 may attempt to detect the second uplink sounding packet from the second STA 103 during the second uplink sounding period. The AP 102 may determine a first measurement (including but not limited to a channel estimate, AoA, ToA and/or other) for the first STA 103 if the first uplink sounding packet is detected. The AP 102 may determine a second (including but not limited to a channel estimate, AoA, ToA and/or other) for the second STA 103 if the second uplink sounding packet is detected. This example may be extended to more than two STAs 103. In addition, another polling frame may be used to indicate, to the first STA 103, that it is to transmit the first uplink sounding packet during the first uplink sounding period, in some embodiments.

At operation 855, the AP 102 may transmit a fine timing measurement (FTM) response frame. In some embodiments, a multi-user FTM response frame may be used, wherein multiple measurements (including but not limited to a channel estimate, AoA, ToA and/or other) may be included. Accordingly, the multi-user FTM response frame may be configurable to include multiple measurements. For instance, the multi-user FTM response frame may include measurement(s) for the STAs 103 for which uplink sounding packets are detected (and therefore the measurement(s) determined). Embodiments are not limited to multi-user FTM response frames, however. In some embodiments, multiple FTM response frames may be transmitted. In a non-limiting example, multiple FTM response frames may be transmitted to individual STAs 103.

In a non-limiting example, the AP 102 may transmit, during the TXOP after the uplink sounding period, an FTM response frame that indicates at least one measurement for an STA 103 for which an uplink sounding packet was detected.

In another non-limiting example, the AP 102 may determine a first measurement (including but not limited to a channel estimate, AoA, ToA and/or other) based on a first uplink sounding packet detected during a first uplink sounding period. The AP 102 may determine a second measurement (including but not limited to a channel estimate, AoA, ToA and/or other) based on a second uplink sounding packet detected during a second uplink sounding period. The AP 102 may transmit, during the TXOP after the second uplink sounding period, a multi-user FTM response frame that indicates the first measurement(s) and the second measurement(s). In some cases, the multi-user FTM response frame may indicates at least: the first measurement if the first uplink sounding packet is detected, and the second measurement if the second uplink sounding packet is detected. This example may be extended to include polling frames, in some cases. This example may be extended to more than two measurements, more than two uplink sounding packets and/or more than two uplink sounding periods, in some cases.

In some embodiments, an apparatus of an AP 102 may comprise memory. The memory may be configurable to store a channel estimate and/or other measurement(s). The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding the TF. The apparatus of the AP 102 may include a transceiver to transmit the TF. The transceiver may transmit and/or receive other frames, PPDUs, messages and/or other elements.

Figure 9:
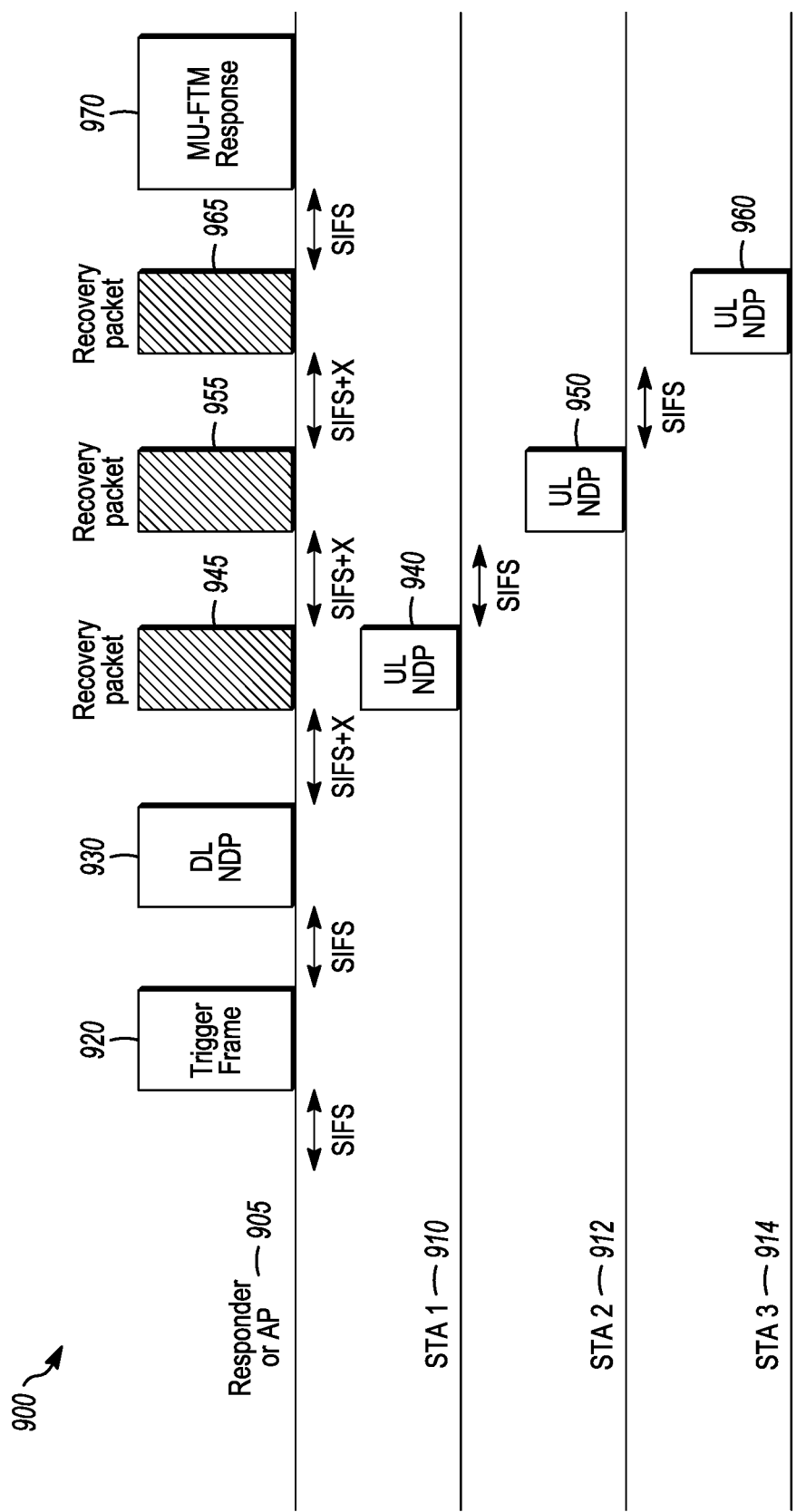
FIG. 9 illustrates an example scenario in accordance with some embodiments.
Figure 10:
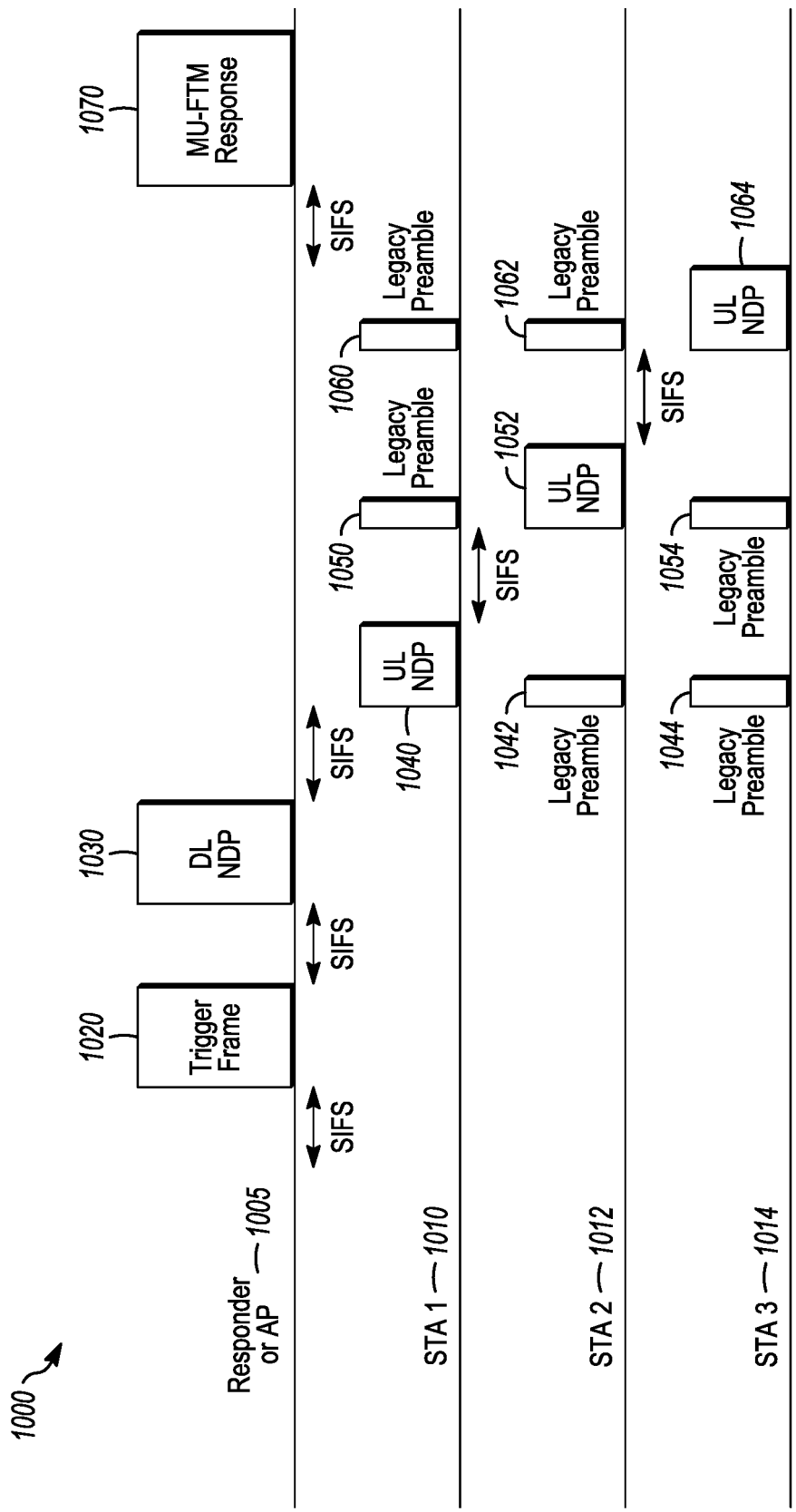
FIG. 10 illustrates another example scenario in accordance with some embodiments.
Figure 11:
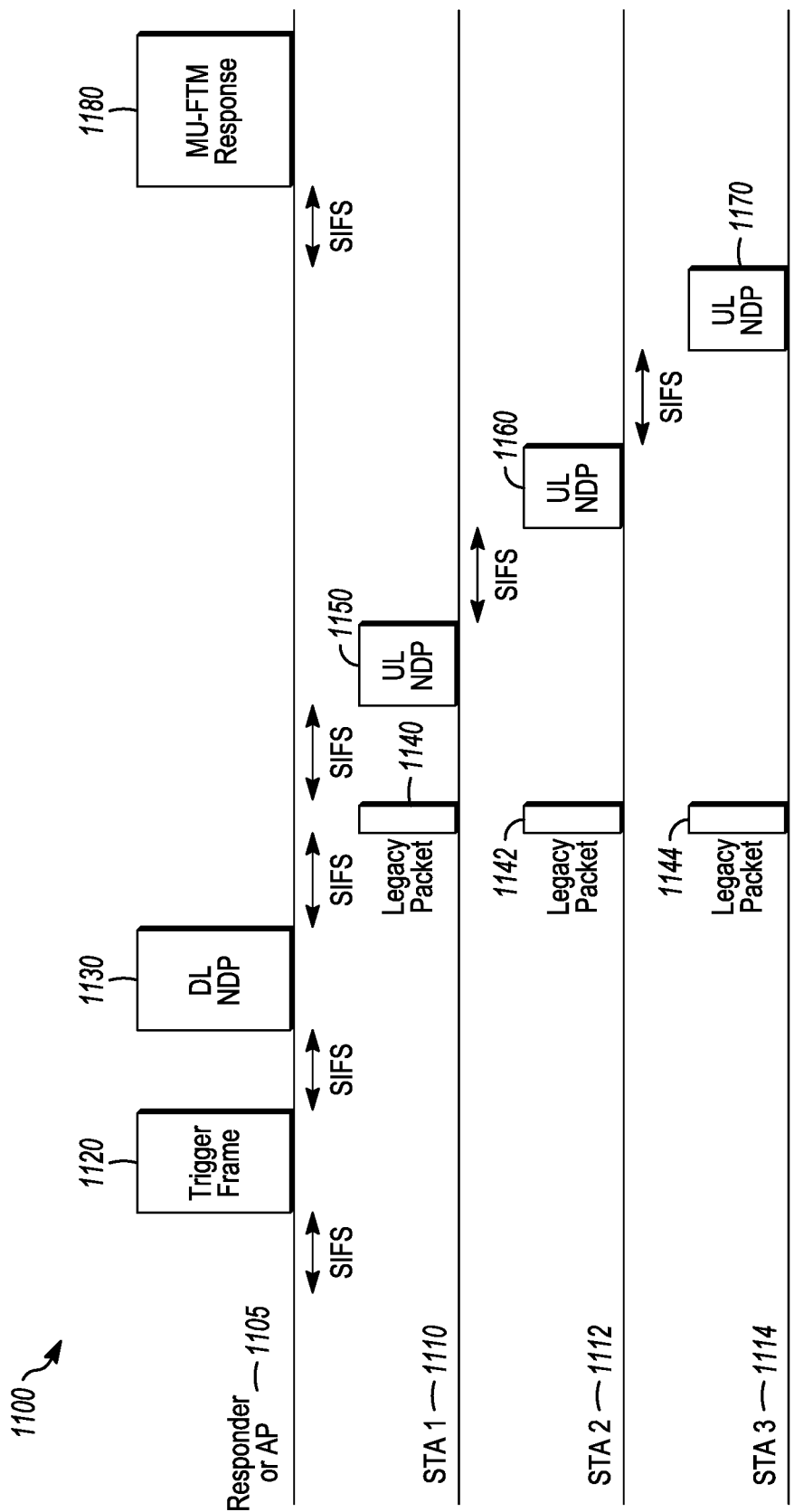
FIG. 11 illustrates another example scenario in accordance with some embodiments.
Figure 12:
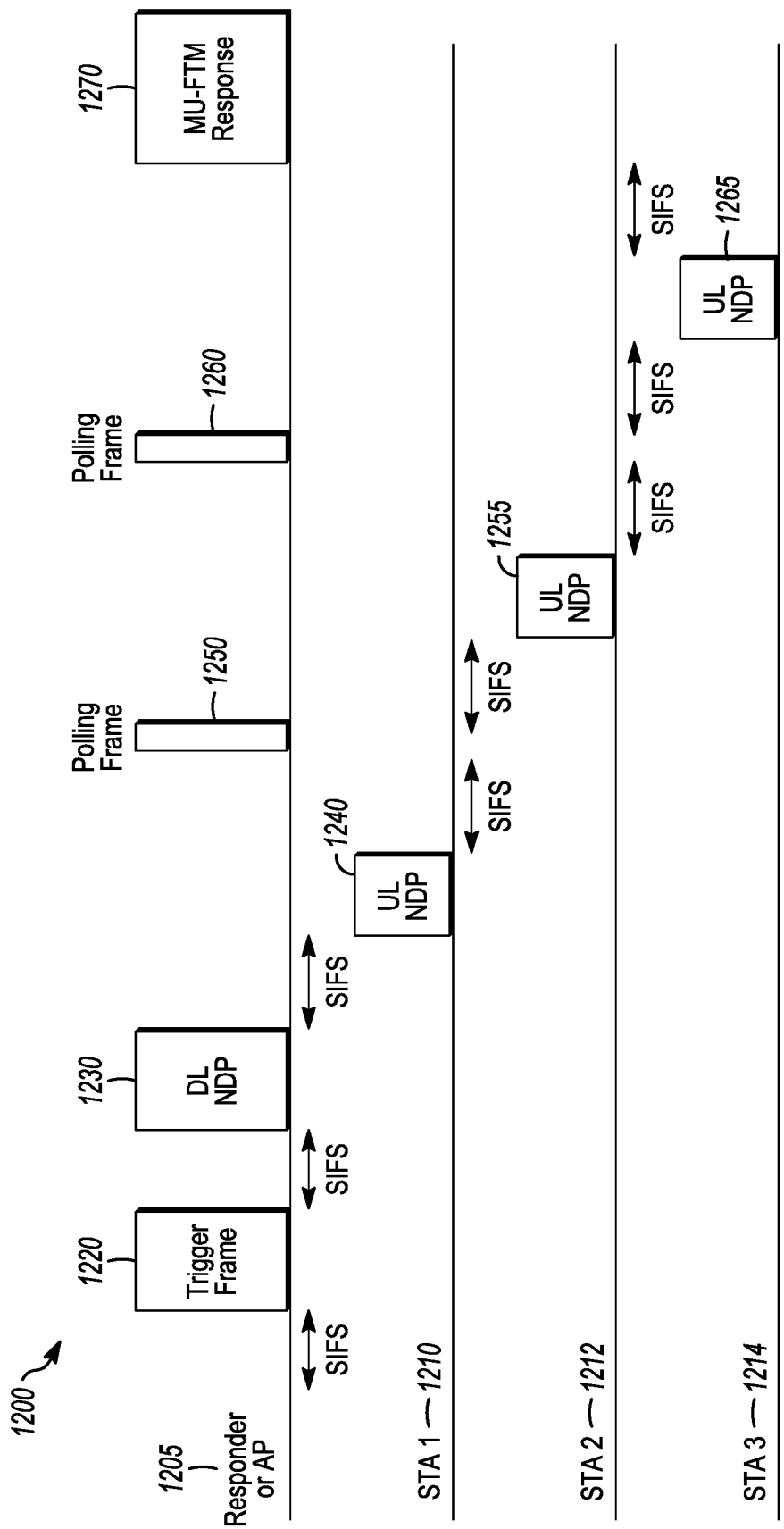
FIG. 12 illustrates another example scenario in accordance with some embodiments.
Figure 13:
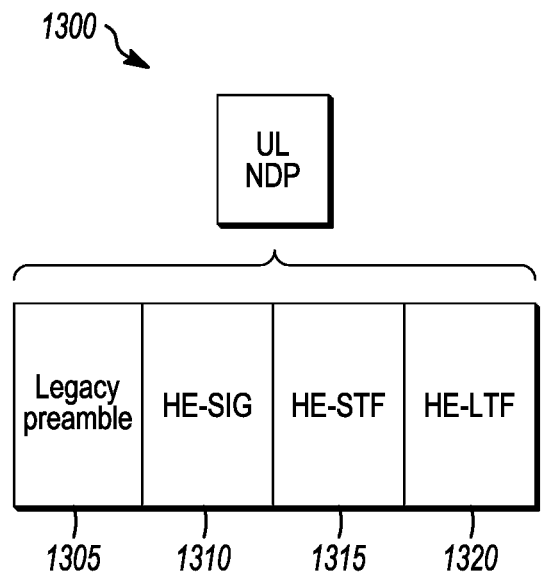
FIG. 13 illustrates an example uplink null data packet (NDP) in accordance with some embodiments.

FIG. 9 illustrates an example scenario in accordance with some embodiments. FIG. 10 illustrates another example scenario in accordance with some embodiments. FIG. 11 illustrates another example scenario in accordance with some embodiments. FIG. 12 illustrates another example scenario in accordance with some embodiments. FIG. 13 illustrates an example uplink null data packet (NDP) in accordance with some embodiments. It should be noted that the examples shown in FIGS. 9-13 may illustrate some or all of the concepts and techniques described herein in some cases, but embodiments are not limited by the examples. For instance, embodiments are not limited by the name, number, type, size, ordering, arrangement, values and/or other aspects of the components, devices, operations, messages, packets, frames, headers, data portions, fields, and other elements as shown in FIGS. 9-13. Although some of the elements shown in the examples of FIGS. 9-13 may be included in a standard, such as 802.11, 802.11ax, WLAN and/or other, embodiments are not limited to usage of such elements that are included in standards. Some embodiments may not necessarily include all components shown in any of FIGS. 9-13. Some embodiments may include one or more additional components.

Referring to FIGS. 9-12, three STAs are shown in the example scenarios 900, 1000, 1100, and 1200. Embodiments are not limited to three STAs, however, as any suitable number of STAs may be used. Accordingly, the concepts shown in FIGS. 9-12 may be applicable to scenarios that involve one, two, four or more STAs.

In the example scenarios shown in FIGS. 9-12, various time durations and/or time intervals are shown in terms of a short inter-frame spacing (SIFS). In some embodiments, the SIFS may be included in an 802.11 standard and/or other standard, although the scope of embodiments is not limited in this respect. Embodiments are not limited to the particular values of time durations and/or time intervals shown. Any suitable values for the time durations and/or time intervals may be used. In addition, embodiments are not limited to values that are based on an SIFS.

Referring to the example scenario shown in FIG. 9, the AP 905 may occupy the medium by transmission of recovery packet(s) (such as 945, 955 and/or 965), such that a third party device may not have a chance to occupy the medium. Accordingly, in this scenario and other scenarios, such action (in this case by the AP 905) may protect transmissions of NDPs (and/or sounding packets). In addition, in this scenario and other scenarios, such action (in this case by the AP 905) may protect access to the medium by third party devices.

In this scenario 900, the AP 905 may send a TF 920 and a DL NDP 930. The AP 905 may expect to receive the UL NDP 940 from the STA 910 after SIFS+round trip time (RTT). If the AP 905 does not receive the UL NDP 940 at the expected time, the AP 905 may send out the recovery packet 945 to occupy the medium (such as at time SIFS+X). In a non-limiting example, the value of X may be shorter than DIFS by an amount equal to (SIFS+X). Other values of X may be used, in some embodiments. In a non-limiting example, the recovery packet 945 may be a legacy format packet and the length field in the L-SIG of the recovery packet may be long enough to cover the time slot allocated to the failed the UL NDP packet 940. Embodiments are not limited to usage of a legacy format packet, however, as any suitable packet may be used as a recovery packet.

In the example scenario 900, the STA 912 may be scheduled to send UL NDP packet 950. The AP 905 may send recovery packet 955 if it does not receive the UL NDP packet 950. The STA 914 may be scheduled to send UL NDP packet 960. The AP 905 may send recovery packet 965 if it does not receive the UL NDP packet 960. An MU-FTM response 970 may be transmitted by the AP 905. In a non-limiting example, the MU-FTM response 970 may include timing information (including but not limited to a channel estimate, AoA, ToA and/or other) that may be based at least partly on one or more of the UL NDPs 940, 950, 960.

Referring to the example scenario 1000 shown in FIG. 10, one or more STA(s) (such as 1010, 1012 and/or 1014) may take action to protect the transmission of UL NDP(s) (such as 1040, 1052, 1064). For example, as shown in FIG. 10, when the STA 1010 begins to transmit the NDP 1040 in an allocated time slot, one or more of the other STAs (1012 and 1014) may transmit legacy preamble (such as 1042 and 1044). A length field in an L-SIG of a legacy preamble (such as 1042 and 1044) may be long enough to cover the time slot allocated to the UL NDP 1040. It should be noted that a legacy preamble may also be included in UL NDP(s) (such as 1040, 1052 and/or 1064). Similarly, in a time slot allocated for transmission of NDP 1052 by the STA 1012, one or more of the other STAs 1010, 1014 may transmit legacy preambles (such as 1050 and/or 1054). Similarly, in a time slot allocated for transmission of NDP 1064 by the STA 1014, one or more of the other STAs 1010, 1012 may transmit legacy preambles (such as 1060 and/or 1062). In some cases, transmission of legacy preambles (such as 1042, 1044, 1050, 1054, 1060, 1062) may reduce a probability that a third party device detects an idle medium. Accordingly, transmission of UL NDP(s) (such as 1040, 1052, 1064) may be protected, in some cases.

In some embodiments, when a time period (such as a time slot) is allocated to a particular STA 103 for transmission of an uplink sounding packet (such as an NDP), other STA(s) 103 may transmit legacy preambles in the time period. In a non-limiting example, the preambles may be transmitted in a beginning portion of the time period. The scope of embodiments is not limited in this respect, however, as the preamble(s) may be transmitted during other portions of the time period, in some embodiments. The other STAs 103 may be one or more of: STAs 103 indicated in the TF that are to transmit uplink sounding packet(s) during the TXOP; STAs 103 indicated in the TF that are to transmit other uplink packet(s) during the TXOP; STAs 103 associated with the AP 102; and/or other.

Referring to the example scenario 1100 in FIG. 11, after receiving the TF 1120 and DL NDP 1130, the STAs 1110, 1112, 1114 may transmit legacy packets 1140, 1142, 1144. A length filed in the L-SIG of the legacy packets 1140, 1142, 1144 may be long enough to cover the transmission time for the UL NDPs 1150, 1160, 1170, in some embodiments. In some cases, multiple STAs (1110, 1112, 1114 in this example) may transmit legacy packets (1140, 1142, 1144 in this example) simultaneously. Accordingly, a third party device may have a high probability of detecting the legacy packets (or at least one of them). For instance, the probability of detecting at least one legacy packet when multiple legacy packets are transmitted may be higher than a probability of detecting a single legacy packet when only one legacy packet is transmitted. The third party device may refrain from accessing the medium during the transmissions of UL NDPs (1150, 1160, 1170 in this example), in some cases.

In some embodiments, legacy packets may be transmitted by multiple STAs 103. For instance, all of the STAs 103 indicated in a TF may transmit legacy packets. Embodiments are not limited as such, however, as one or more STAs 103 (but not necessarily all of the STAs 103 indicated in the TF may transmit legacy packets, in some embodiments.

Referring to the example scenario 1200 shown in FIG. 12, the AP 1205 may poll one or more STAs 1210, 1212, 1214 to transmit UL NDP(s) using one or more polling frames. For instance, the polling frame 1250 may be used to poll STA 1212 to transmit the UL NDP 1255, and the polling frame 1260 may be used to poll STA 1214 to transmit the UL NDP 1265. It should be noted that the STA 1210 may be polled by the TF 1220 as shown in FIG. 12. Embodiments are not limited as such, however, as a separate polling frame may be used to poll the STA 1210, in some embodiments. Any suitable frame may be used as a polling frame.

Referring to FIG. 13, the example uplink NDP frame 1300 may include one or more of the following: a legacy preamble 1305, high efficiency (HE) signal field (HE-SIG) 1310, HE short training field (HE-STF) 1315, HE long training field (HE-LTF) 1320. The uplink NDP frame 1300 may include any number (including zero, one or other) of other fields and/or parameters and may include other information, in some embodiments. Embodiments are not limited to the ordering, arrangement, sizes, names and/or other characteristics of the parameters shown.

In some embodiments, a downlink NDP (DL NDP) frame may have a similar structure, although the scope of embodiments is not limited in this respect.

Figure 14:
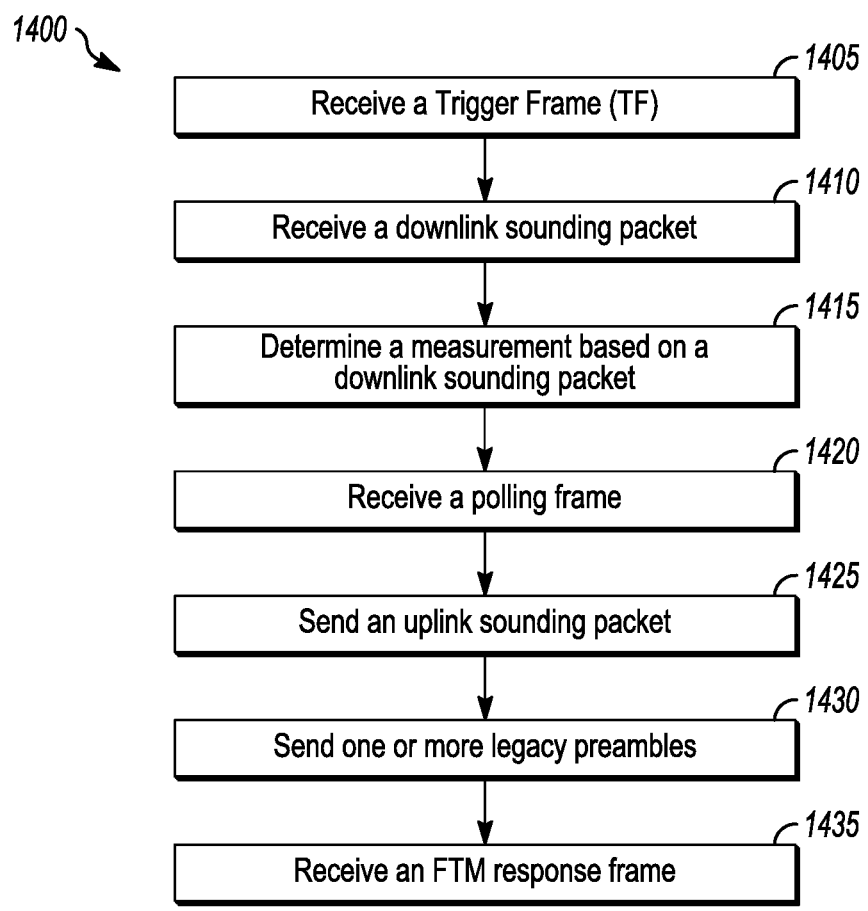
FIG. 14 illustrates the operation of another method of communication in accordance with some embodiments.

FIG. 14 illustrates the operation of another method of communication in accordance with some embodiments. As mentioned previously regarding the method 800, embodiments of the method 1400 may include additional or even fewer operations or processes in comparison to what is illustrated in FIG. 14 and embodiments of the method 1400 are not necessarily limited to the chronological order that is shown in FIG. 14. In describing the method 1400, reference may be made to any of FIGS. 1-14, although it is understood that the method 1400 may be practiced with any other suitable systems, interfaces and components. In addition, embodiments of the method 1400 may be applicable to STAs 103, APs 102, UEs, eNBs and/or other wireless or mobile devices. The method 1400 may also be applicable to an apparatus of an AP 102, STA 103, and/or other device, in some embodiments.

It should be noted that the method 1400 may be practiced by an AP 102 and may include exchanging of elements, such as frames, signals, messages and/or other elements with an STA 103. The method 800 may be practiced by an STA 103 and may include exchanging of elements, such as frames, signals, messages and/or other elements with an AP 102. In some cases, operations and techniques described as part of the method 800 may be relevant to the method 1400. In addition, embodiments of the method 1400 may include one or more operations that may be the same as, similar to or reciprocal to one or more operations of the method 800 (and/or other operation(s) described herein). For instance, an operation of the method 1400 may include reception of an element (such as a frame, block, message and/or other) by an STA 103 and the method 800 may include transmission of a same or similar element by the AP 102. In addition, one or more operations included in the method 800 may be the same as, or similar to, one of more operations included in the method 1400.

In addition, previous discussion of various techniques, operations and/or concepts may be applicable to the method 1400, in some cases, including contention for access to a channel, TFs, TXOP, uplink sounding packets, uplink NDP, downlink sounding packets, downlink NDP, NDP, recovery packet, legacy preamble, measurement(s) (including but not limited to a channel estimate, AoA, ToA and/or other), measurement(s) based on uplink sounding packet(s), FTM response frame, MU-FTM response frame and/or others.

At operation 1405, the STA 103 may receive a TF. At operation 1410, the STA 103 may receive a downlink sounding packet. In a non-limiting example, the downlink sounding packet may be an NDP and/or downlink NDP. At operation 1415, the STA 103 may determine a measurement (including but not limited to a channel estimate, AoA, ToA and/or other) based at least partly on the downlink sounding packet. At operation 1420, the STA 103 may receive a polling frame. It should be noted that embodiments of the method 1400 may not necessarily include all operations shown in FIG. 14. For instance, in some embodiments, the polling frame may not be used, and operation 1420 may not necessarily be performed.

At operation 1425, the STA 103 may send an uplink sounding packet. In a non-limiting example, the uplink sounding packet may be an NDP and/or uplink NDP. At operation 1430, the STA 103 may send one or more legacy preambles. It should be noted that embodiments of the method 1400 may not necessarily include all operations shown in FIG. 14. For instance, in some embodiments, the STA 103 may not necessarily transmit the legacy preambles, and operation 1430 may not necessarily be performed At operation 1435, the STA 103 may receive one or more FTM response frames. The FTM response frame(s) may include one or more measurements (including but not limited to a channel estimate, AoA, ToA and/or other), which may include at least one measurement for the STA 103. In some embodiments, the STA 103 may receive a multi-user FTM response, although the scope of embodiments is not limited in this respect. In some embodiments, the STA 103 may receive an FTM response frame that may be dedicated to the STA 103 and may be configurable to include at least one measurement for the STA 103.

In some embodiments, the STA 103 may receive a TF from the AP 102 in a channel during a TXOP. The TF may schedule one or more uplink sounding periods during the TXOP. The STA 103 may transmit, in the channel during a predetermined preamble transmission period of the TXOP, a legacy preamble to cause other devices (including but not limited to STAs 103 unassociated with the AP 102) that monitor the channel to detect a busy condition for the channel. The STA 103 may transmit the uplink sounding packet in the channel during the uplink sounding period allocated to the STA 103. The preamble transmission period may be allocated for transmissions of preambles by STAs 103 indicated in the TF. In a non-limiting example, the preamble transmission period may occur before the uplink sounding periods, although the scope of embodiments is not limited in this respect. In some embodiments, the STA 103 may receive an FTM response from the AP 102 that indicates a measurement (including but not limited to a channel estimate, AoA, ToA and/or other) for the STA 103 based on the first uplink sounding packet.

In some embodiments, the STA 103 may receive a TF from an AP 102 during a TXOP obtained by the AP 102. The STA 103 may be associated with the AP 102, although the scope of embodiments is not limited in this respect. The TF may indicate: a first uplink sounding period of the TXOP allocated to the STA 103 for transmission of a first uplink sounding packet, and a second uplink sounding period of the TXOP allocated to another STA 103 (which may be associated with the AP 102) for transmission of a second uplink sounding packet. The STA 103 may transmit, during the first uplink sounding period, the first uplink sounding packet. The STA 103 may transmit, during the second uplink sounding period, a legacy preamble to cause other devices (including but not limited to STAs 103 unassociated with the AP 102) to refrain from detection of an idle condition during the second uplink sounding period. In some embodiments, the STA 103 may transmit the legacy preamble to cause the other devices to detect a busy condition during the second uplink sounding period.

In some embodiments, the legacy preamble may include a legacy signal (L-SIG) field that includes a length field. In a non-limiting example, the length field may be based on a time difference between a transmission time of the legacy preamble and an end time of the second uplink sounding period. In some embodiments, the STA 103 may receive an FTM response from the AP 102 that indicates one or more measurements (including but not limited to a channel estimate, AoA, ToA and/or other) for the STA 103 based on the first uplink sounding packet.

In some embodiments, the STA 103 may encode the first uplink sounding packet as part of an orthogonal frequency division multiplexing (OFDM) signal. In some embodiments, the TF may be received in a channel that includes multiple resource units (RUs). The STA 103 may encode the first uplink sounding packet for orthogonal frequency division multiple access (OFDMA) transmission in one or more of the RUs indicated by the TF.

In some embodiments, an apparatus of an STA 103 may comprise memory. The memory may be configurable to store the length field. The memory may store one or more other elements and the apparatus may use them for performance of one or more operations. The apparatus may include processing circuitry, which may perform one or more operations (including but not limited to operation(s) of the method 1400 and/or other methods described herein). The processing circuitry may include a baseband processor. The baseband circuitry and/or the processing circuitry may perform one or more operations described herein, including but not limited to decoding the TF. The apparatus of the STA 103 may include a transceiver to receive the TF. The transceiver may transmit and/or receive other frames, PPDUs, messages and/or other elements.

In some embodiments, one or more operations may be performed to enable the AP 102 and/or STA(s) 103 to protect the transmission of uplink sounding NDPs in a measurement protocol of 802.11az. The AP 102 and STA(s) 103 may exchange sounding packets with each other in the measurement phase. A round trip time (RTT) of sounding packet(s) may be used to calculate the distance between the AP 102 and an STA 103. The RTT may be determined based on arrival time(s) of sounding packet(s), which may be estimated from the channel responses. The AP 102 may transmit a TF. One or more STAs 103 may transmit an uplink sounding packet (including but not limited to an NDP). In this trigger-based measurement protocol, to avoid the near-far problem between the NDP packets from different STAs 103, the STAs 103 may be scheduled by the AP 102 to transmit the UL sounding packet (such as an NDP) sequentially in staggered time slots. For such an arrangement of staggered uplink sounding packet transmissions, the STAs 103 may take turns occupying the medium. Accordingly, the medium could be potentially idle for a third party device (such as another STA, a third party STA, an STA unassociated with the AP 102 and/or other). The third party device may occupy the medium in some cases, including but not limited to one or more of the following cases: if the third party device does not detect the TF; if the third party device is far away from the STAs 103 sending the UL sounding packets. Accordingly, if the third party device occupies the medium in such cases, transmission of UL sounding packets may suffer, in some cases.

One or more methods (including but not limited to those described herein) may be used in these and other scenarios. Such methods may be used for one or more of the following: to avoid the above mentioned issue; to provide more protection for the UL sounding packet transmission, to reduce a possibility (and/or probability) that a third party device determines that the medium is idle during the transmission of the UL sounding packet; and/or other purpose.

In Example 1, an apparatus of an access point (AP) may comprise memory. The apparatus may further comprise processing circuitry. The processing circuitry may be configured to encode, for transmission during a transmission opportunity (TXOP), a trigger frame (TF) to indicate that a station (STA) is to transmit an uplink sounding packet during an uplink sounding period of the TXOP. The processing circuitry may be further configured to attempt to detect the uplink sounding packet during the uplink sounding period. The processing circuitry may be further configured to, if the uplink sounding packet is not detected during the uplink sounding period: encode, for transmission during the uplink sounding period, a recovery packet to cause other STAs to determine a busy condition during the uplink sounding period. The processing circuitry may be further configured to, if the uplink sounding packet is detected during the uplink sounding period: determine a channel estimate for the STA based on the uplink sounding packet.

In Example 2, the subject matter of Example 1, wherein the processing circuitry may be further configured to encode the recovery packet for the transmission in the uplink sounding period to restrict access by the other STAs during at least the uplink sounding period.

In Example 3, the subject matter of one or any combination of Examples 1-2, wherein the processing circuitry may be further configured to determine a length of the recovery packet for which an end time of the recovery packet is later than an end time of the uplink sounding period. The processing circuitry may be further configured to encode the recovery packet to include a legacy preamble that includes a legacy signal (L-SIG) field that includes the length of the recovery packet.

In Example 4, the subject matter of one or any combination of Examples 1-3, wherein the uplink sounding packet may be a null data packet (NDP).

In Example 5, the subject matter of one or any combination of Examples 1-4, wherein the processing circuitry may be further configured to encode, for transmission during the TXOP after the uplink sounding period, a fine timing measurement (FTM) response message that is based at least partly on the channel estimate for the STA.

In Example 6, the subject matter of one or any combination of Examples 1-5, wherein the STA is a first STA, the uplink sounding period is a first uplink sounding period, the uplink sounding packet is a first uplink sounding packet, the recovery packet is a first recovery packet, and the channel estimate is a first channel estimate. The processing circuitry may be further configured to encode the TF to indicate that a second STA is to transmit a second uplink sounding packet during a second uplink sounding period of the TXOP. The second uplink sounding period may be later than the first uplink sounding period. The processing circuitry may be further configured to attempt to detect the second uplink sounding packet during the second uplink sounding period. The processing circuitry may be further configured to, if the second uplink sounding packet is not detected during the second uplink sounding period: encode, for transmission during the second uplink sounding period, a second recovery packet to cause other STAs to detect a busy condition during the second uplink sounding period. The processing circuitry may be further configured to, if the second uplink sounding packet is detected during the second uplink sounding period: determine a second channel estimate for the second STA based on the second uplink sounding packet.

In Example 7, the subject matter of one or any combination of Examples 1-6, wherein the processing circuitry may be further configured to encode, for transmission during the TXOP after the second uplink sounding period, a multi-user fine timing measurement (MU-FTM) response message that is based on the first channel estimate and the second channel estimate.

In Example 8, the subject matter of one or any combination of Examples 1-7, wherein the STA is included in a plurality of STAs. The processing circuitry may be further configured to encode the TF to indicate multiple uplink sounding periods for transmission of uplink sounding packets by the plurality of STAs. The processing circuitry may be further configured to attempt to detect uplink sounding packets during the uplink sounding periods. The processing circuitry may be further configured to encode, for transmission during one or more uplink sounding periods in which the uplink sounding packets are not detected, one or more recovery packets to cause other STAs to determine a busy condition.

In Example 9, the subject matter of one or any combination of Examples 1-8, wherein the processing circuitry may be further configured to contend for the TXOP to obtain access to a channel. The processing circuitry may be further configured to encode the TF for transmission in the channel. The processing circuitry may be further configured to encode the recovery packet for transmission in the channel. The processing circuitry may be further configured to attempt to detect the uplink sounding packet in the channel.

In Example 10, the subject matter of one or any combination of Examples 1-9, wherein the processing circuitry may be further configured to, if the uplink sounding packet is detected during the uplink sounding period: determine, based at least partly on the channel estimate for the STA, a time of arrival (ToA) and/or an angle of arrival (AoA).

In Example 11, the subject matter of one or any combination of Examples 1-10, wherein the memory may be configurable to store the channel estimate.

In Example 12, the subject matter of one or any combination of Examples 1-11, wherein the apparatus may further include a transceiver to transmit the TF.

In Example 13, the subject matter of one or any combination of Examples 1-12, wherein the processing circuitry may include a baseband processor to encode the TF.

In Example 14, a non-transitory computer-readable storage medium may store instructions for execution by one or more processors to perform operations for communication by an access point (AP). The operations may configure the one or more processors to encode, for transmission during a transmission opportunity (TXOP), a trigger frame (TF) to indicate that a plurality of stations (STAs) are to transmit uplink sounding packets during the TXOP. The operations may further configure the one or more processors to attempt to detect a first uplink sounding packet from a first STA of the plurality during a first uplink sounding period of the TXOP. The operations may further configure the one or more processors to encode, for transmission after the first uplink sounding period, a polling frame to indicate that a second STA of the plurality is to transmit a second uplink sounding packet during a second uplink sounding period of the TXOP. The operations may further configure the one or more processors to attempt to detect the second uplink sounding packet from the second STA during the second uplink sounding period.

In Example 15, the subject matter of Example 14, wherein the operations may further configure the one or more processors to determine a first channel estimate for the first STA if the first uplink sounding packet is detected. The operations may further configure the one or more processors to determine a second channel estimate for the second STA if the second uplink sounding packet is detected. The operations may further configure the one or more processors to encode, for transmission, a multi-user fine timing measurement (MU-FTM) response that indicates at least: the first channel estimate if the first uplink sounding packet is detected, and the second channel estimate if the second uplink sounding packet is detected.

In Example 16, the subject matter of one or any combination of Examples 14-15, wherein the operations may further configure the one or more processors to encode a downlink sounding packet for transmission during a downlink sounding period that occurs after transmission of the TF and before the first uplink sounding period. The downlink sounding packet may be transmitted to enable channel estimation at the STAs.

In Example 17, the subject matter of one or any combination of Examples 14-16, wherein the operations may further configure the one or more processors to encode a downlink sounding packet for transmission during a downlink sounding period that occurs after the uplink sounding period. The downlink sounding packet may be transmitted to enable channel estimation at the STAs.

In Example 18, a method of sounding at a station (STA) may comprise decoding a trigger frame (TF) received from an access point (AP) in a channel during a transmission opportunity (TXOP). The TF may schedule one or more uplink sounding periods during the TXOP. The method may further comprise encoding, for transmission in the channel during a predetermined preamble transmission period of the TXOP, a legacy preamble to cause other STAs that monitor the channel to detect a busy condition for the channel. The method may further comprise encoding an uplink sounding packet for transmission in the channel during the uplink sounding period allocated to the STA. The preamble transmission period may be allocated for transmissions of preambles by STAs indicated in the TF. The preamble transmission period may occur before the uplink sounding periods.

In Example 19, the subject matter of Example 18, wherein the method may further comprise decoding a fine timing measurement (FTM) response from the AP that includes one or more of: an uplink channel estimate based on the uplink sounding packet, a time of arrival (ToA) based on the uplink sounding packet, and an angle of arrival (AoA) based on the uplink sounding packet.

In Example 20, the subject matter of one or any combination of Examples 18-19, wherein the FTM response message may be a multi-user FTM (MU-FTM) response message configurable to include multiple uplink channel estimates for multiple STAs.

In Example 21, an apparatus of a station (STA) may comprise memory. The apparatus may further comprise processing circuitry. The processing circuitry may be configured to decode a trigger frame (TF) received from an access point (AP) during a transmission opportunity (TXOP) obtained by the AP. The STA may be associated with the AP. The TF may indicate a first uplink sounding period of the TXOP allocated to the STA for transmission of a first uplink sounding packet. The TF may further indicate a second uplink sounding period of the TXOP allocated to another STA associated with the AP for transmission of a second uplink sounding packet. The processing circuitry may be further configured to encode, for transmission during the first uplink sounding period, the first uplink sounding packet. The processing circuitry may be further configured to encode, for transmission during the second uplink sounding period, a legacy preamble to cause STAs unassociated with the AP to refrain from detection of an idle condition during the second uplink sounding period.

In Example 22, the subject matter of Example 21, wherein the processing circuitry may be further configured to encode the legacy preamble to include a legacy signal (L-SIG) field that includes a length field. The length field may be based on a time difference between a transmission time of the legacy preamble and an end time of the second uplink sounding period.

In Example 23, the subject matter of one or any combination of Examples 21-22, wherein the processing circuitry may be further configured to decode a fine timing measurement (FTM) response from the AP that includes one or more of: an uplink channel estimate based on the first uplink sounding packet, a time of arrival (ToA) based on the first uplink sounding packet, and an angle of arrival (AoA) based on the first uplink sounding packet.

In Example 24, the subject matter of one or any combination of Examples 21-23, wherein the FTM response message may be a multi-user FTM (MU-FTM) response message configurable to include multiple uplink channel estimates for multiple STAs.

In Example 25, the subject matter of one or any combination of Examples 21-24, wherein the processing circuitry may be further configured to encode the first uplink sounding packet as part of an orthogonal frequency division multiplexing (OFDM) signal.

In Example 26, the subject matter of one or any combination of Examples 21-25, wherein the TF may be received in a channel that includes multiple resource units (RUs). The processing circuitry may be further configured to encode the first uplink sounding packet for orthogonal frequency division multiple access (OFDMA) transmission in one or more of the RUs indicated by the TF.

In Example 27, an apparatus of an access point (AP) may comprise means for encoding, for transmission during a transmission opportunity (TXOP), a trigger frame (TF) to indicate that a plurality of stations (STAs) are to transmit uplink sounding packets during the TXOP. The apparatus may further comprise means for attempting to detect a first uplink sounding packet from a first STA of the plurality during a first uplink sounding period of the TXOP. The apparatus may further comprise means for encoding, for transmission after the first uplink sounding period, a polling frame to indicate that a second STA of the plurality is to transmit a second uplink sounding packet during a second uplink sounding period of the TXOP. The apparatus may further comprise means for attempting to detect the second uplink sounding packet from the second STA during the second uplink sounding period.

In Example 28, the subject matter of Example 27, wherein the apparatus may further comprise means for determining a first channel estimate for the first STA if the first uplink sounding packet is detected. The apparatus may further comprise means for determining a second channel estimate for the second STA if the second uplink sounding packet is detected. The apparatus may further comprise means for encoding, for transmission, a multi-user fine timing measurement (MU-FTM) response that indicates at least: the first channel estimate if the first uplink sounding packet is detected, and the second channel estimate if the second uplink sounding packet is detected.

In Example 29, the subject matter of one or any combination of Examples 27-28, wherein the apparatus may further comprise means for encoding a downlink sounding packet for transmission during a downlink sounding period that occurs after transmission of the TF and before the first uplink sounding period. The downlink sounding packet may be transmitted to enable channel estimation at the STAs.

In Example 30, the subject matter of one or any combination of Examples 27-29, wherein the apparatus may further comprise means for encoding a downlink sounding packet for transmission during a downlink sounding period that occurs after the uplink sounding period. The downlink sounding packet may be transmitted to enable channel estimation at the STAs.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising: memory;
and processing circuitry, configured to:
encode, for transmission during a transmission opportunity (TXOP) a sounding trigger frame (TF) to indicate that a station (STA) is to respond to the sounding TF with an uplink null data packet (UL-NDP) during an uplink sounding period of the TXOP;
if the UL-NDP is not detected during the uplink sounding period;
encode, for transmission during the uplink sounding period, a recovery packet to cause other STAs, that are permitted to transmit during the TXOP, to refrain from transmitting during the uplink sounding period; and
if the UL-NDP is detected during the uplink sounding period: determine a channel estimate for the STA based on the uplink sounding packet;
determine a length of the recovery packet for which an end time of the recovery packet is later than an end time of the uplink sounding period; and
encode the recovery packet to include a legacy preamble that includes a legacy signal (L-SIG) field that includes the length of the recovery packet.

2. The apparatus according to claim 1, the processing circuitry further configured to: encode the recovery packet for the transmission in the uplink sounding period to restrict access by the other STAs during at least the uplink sounding period.

3. The apparatus according to claim 1, the processing circuitry further configured to: encode, for transmission during the TXOP after the uplink sounding period, a fine timing measurement (FTM) response message that is based at least partly on the channel estimate for the STA.

4. The apparatus according to claim 1, wherein: the STA is a first STA, the uplink sounding period is a first uplink sounding period, the uplink sounding packet is a first uplink sounding packet, the recovery packet is a first recovery packet, and the channel estimate is a first channel estimate, the processing circuitry is further configured to: encode the TF to indicate that a second STA is to transmit a second uplink sounding packet during a second uplink sounding period of the TXOP, the second uplink sounding period later than the first uplink sounding period; process signals received during the second uplink sounding period; if the second uplink sounding packet is not detected during the second uplink sounding period: encode, for transmission during the second uplink sounding period, a second recovery packet to cause other STAs to detect a busy condition during the second uplink sounding period; and if the second uplink sounding packet is detected during the second uplink sounding period: determine a second channel estimate for the second STA based on the second uplink sounding packet.

5. The apparatus according to claim 4, processing circuitry further configured to: encode, for transmission during the TXOP after the second uplink sounding period, a multi-user fine timing measurement (MU-FTM) response message that is based on the first channel estimate and the second channel estimate.

6. The apparatus according to claim 1, wherein: the STA is included in a plurality of STAs, the processing circuitry is further configured to encode the TF to indicate multiple uplink sounding periods for transmission of uplink sounding packets by the plurality of STAs; process signals received during the uplink sounding periods; determine if uplink sounding packets are detected during the uplink sounding periods based on the processing of the signals received; and encode, for transmission during one or more uplink sounding periods in which the uplink sounding packets are not detected, one or more recovery packets to cause other STAs to determine a busy condition.

7. The apparatus according to claim 1, the processing circuitry further configured to: contend for the TXOP to obtain access to a channel; encode the TF for transmission in the channel; and encode the recovery packet for transmission in the channel.

8. The apparatus according to claim 1, the processing circuitry further configured to: if the uplink sounding packet is detected during the uplink sounding period: determine, based at least partly on the channel estimate for the STA, a time of arrival (ToA) and/or an angle of arrival (AoA).

9. The apparatus according to claim 1, wherein the memory is configurable to store the channel estimate.

10. The apparatus according to claim 1, wherein the apparatus further includes a transceiver to transmit the TF.

11. The apparatus according to claim 1, wherein the processing circuitry includes a baseband processor to encode the TF.

* * * * *

UNITED STATES PATENT AND TRADEMARK OFFICE
CERTIFICATE OF CORRECTION

PATENT NO. : 10,686,628 B2
APPLICATION NO. : 15/719392
DATED : June 16, 2020
INVENTOR(S) : Amizur et al.

Page 1 of 1

It is certified that error appears in the above-identified patent and that said Letters Patent is hereby corrected as shown below:

In the Claims

In Column 33, Line 17, in Claim 1, delete "period;" and insert --period:-- therefor In Column 34, Line 13, in Claim 5, after "4," insert --the--

Signed and Sealed this
Twenty-second Day of December, 2020

Andrei Iancu
*Director of the United States Patent and Trademark Office*